United States Patent
Lin

(10) Patent No.: US 12,461,581 B2
(45) Date of Patent: Nov. 4, 2025

(54) METHOD FOR AN ELECTRONIC DEVICE IN A POWER MODE CHANGE OPERATION, ELECTRONIC DEVICE, AND COMMUNICATION SYSTEM

(71) Applicant: SK hynix Inc., Icheon-si (KR)

(72) Inventor: Fu Hsiung Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 154 days.

(21) Appl. No.: 18/532,866

(22) Filed: Dec. 7, 2023

(65) Prior Publication Data

US 2025/0172985 A1 May 29, 2025

(30) Foreign Application Priority Data

Nov. 27, 2023 (TW) .................................. 112145806

(51) Int. Cl.
*G06F 1/30* (2006.01)
*G06F 11/07* (2006.01)
*G06F 13/28* (2006.01)

(52) U.S. Cl.
CPC ............ *G06F 1/30* (2013.01); *G06F 11/0772* (2013.01); *G06F 13/28* (2013.01)

(58) Field of Classification Search
CPC ...................................... G06F 1/30; G06F 1/28
See application file for complete search history.

(56) References Cited

U.S. PATENT DOCUMENTS

| | | | |
|---|---|---|---|
| 9,223,380 B2 | 12/2015 | Radulescu | |
| 10,162,402 B2 | 12/2018 | Seo et al. | |
| 2016/0034413 A1* | 2/2016 | Park | G06F 13/4265 710/105 |
| 2019/0377402 A1 | 12/2019 | Chao et al. | |
| 2020/0341825 A1* | 10/2020 | Sudarmani | G06F 9/542 |
| 2022/0283622 A1* | 9/2022 | Wang | G06F 13/382 |
| 2024/0089886 A1* | 3/2024 | Lin | H04W 56/0065 |

FOREIGN PATENT DOCUMENTS

CN 115190012 A 10/2022

* cited by examiner

*Primary Examiner* — Raymond N Phan
(74) *Attorney, Agent, or Firm* — WILLIAM PARK AND ASSOCIATES LTD.

(57) ABSTRACT

A method for an electronic device in a power mode change operation, an electronic device, and a communication system are provided. In an embodiment, the method comprises the following steps. During the power mode change operation, the electronic device detects whether a power mode change failure occurs in the electronic device after transmitting a power mode change request frame. The electronic device transmits the first burst ending signal to notify another electronic device of the power mode change failure in the electronic device, wherein the first burst ending signal indicates burst closure and includes a first error indication signal to indicate the power mode change failure in the electronic device. Thus, in response to the first burst ending signal, the other electronic device can abort a power mode configuration to avoid undesirable un-synchronous states.

28 Claims, 17 Drawing Sheets

METHOD FOR AN ELECTRONIC DEVICE IN A POWER MODE CHANGE OPERATION, ELECTRONIC DEVICE, AND COMMUNICATION SYSTEM

CROSS-REFERENCE TO RELATED APPLICATION

This non-provisional application claims priority under 35 U.S.C. § 119(a) to Taiwanese Patent Application No. 112145806 filed on Nov. 27, 2023, in the Taiwan Intellectual Property Office, the entire contents of which are hereby incorporated by reference.

BACKGROUND OF THE INVENTION

1. Field of the Invention

The present disclosure relates to circuit, controllers, and methods for frame transmission for an electronic device, and in particular to circuits, controllers, and methods for frame transmission for an electronic device in a power mode change operation, electronic devices, and communication systems.

2. Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard or UniPro specification includes a local host (e.g., a computing device or chip) and a remote device (e.g., a storage device or another chip). A bidirectional link including an inbound link and an outbound link is established between the host and the device, and this link can be configured with one or multiple lanes in either of the transmission directions. According to the UniPro specification (such as UniPro version 2.0), either device can change the power mode of a link by assigning a new power configuration. The power configuration includes UniPro Power Mode, M-PHY-specific Attributes (e.g., GEARs), and Lane count information. The power configuration may have separate settings for forward, reverse, or both directions.

BRIEF SUMMARY OF THE INVENTION

In the present disclosure, technologies for facilitating error recovery of power mode change of a communication system are provided. The technologies are suitable to implement in various embodiment as methods for an electronic device in a power mode change operation, electronic devices, and communication systems. An electronic device which encounters a power mode change failure is capable of notifying another electronic device of the power mode change failure by using a burst ending signal. Thus, in response to the burst ending signal, the other electronic device can abort a power mode configuration obtained during the power mode change operation to avoid undesirable un-synchronous states.

Embodiments of a method for an electronic device in a power mode change operation are provided. The method comprises the following steps. By the electronic device, during the power mode change operation, it is detected whether a power mode change failure occurs in the electronic device after transmitting a power mode change request frame. By the electronic device, in response to the power mode change failure in the electronic device, the first burst ending signal is transmitted in a first burst to another electronic device to notify the other electronic device of the power mode change failure in the electronic device, wherein the first burst ending signal indicates burst closure and includes a first error indication signal to indicate the power mode change failure in the electronic device.

Embodiments of an electronic device configured to communicate with another electronic device are provided. The electronic device comprises a controller including a physical layer circuit for signal transmission and a link controller for data transmission, coupled to the physical layer circuit. The controller is capable of performing a plurality of operations including: during a power mode change operation, detecting whether a power mode change failure occurs in the electronic device after transmitting a power mode change request frame; and in response to the power mode change failure in the electronic device, transmitting the first burst ending signal in a first burst to the other electronic device to notify the other electronic device of the power mode change failure in the electronic device, wherein the first burst ending signal indicates burst closure and includes a first error indication signal to indicate the power mode change failure in the electronic device.

Embodiments of a method for an electronic device in a power mode change operation are provided. The method comprises the following steps. By the electronic device, during the power mode change operation, a first burst ending signal is received in a first burst from another electronic device and it is detected that the first burst ending signal indicates burst closure and includes a first error indication signal to notify the electronic device that a power mode change failure occurs in the other electronic device. By the electronic device, in response to the detected first burst ending signal, the power mode change failure in the other electronic device is accepted to abort a power mode configuration obtained during the power mode change operation and to end the first burst.

Embodiments of an electronic device configured to communicate with another electronic device are provided. The electronic device comprises a controller including a physical layer circuit for signal transmission and a link controller for data transmission, coupled to the physical layer circuit. The controller is capable of performing a plurality of operations including: during the power mode change operation, receiving a first burst ending signal in a first burst from the other electronic device and detecting that the first burst ending signal indicates burst closure and includes a first error indication signal to notify the electronic device that a power mode change failure occurs in the other electronic device; and in response to the detected first burst ending signal, accepting the power mode change failure in the other electronic device to abort the power mode configuration obtained during the power mode change operation and to end the first burst.

Embodiments of a communication system are provided. The communication system comprising a first electronic device and a second electronic device. The first electronic device is configured to transmit a first burst ending signal in a first burst during a power mode change operation when a power mode change failure occurs in the first electronic device, wherein the first burst ending signal indicates burst closure and includes a first error indication signal to indicate the power mode change failure in the first electronic device. The second electronic device is configured, during the power mode change operation, to receive the first burst ending signal in the first burst from the first electronic device and to detect that the first burst ending signal indicates burst closure and includes the first error indication signal to indicate the power mode change failure in the first electronic device, wherein in response to the detected first burst ending signal, the second electronic device accepts the power mode change failure in the first electronic device to abort a power mode configuration obtained during the power mode change operation and to end the first burst.

In some embodiments of the method, the electronic device, or the communication system, the first error indication signal of the first burst ending signal includes a data pattern to indicate the power mode change failure.

In some embodiments of the method, the electronic device, or communication system, the first error indication signal of the first burst ending signal includes a tail of burst to indicate the power mode change failure and to indicate closure of the first burst.

In some embodiments of the method, the electronic device, or communication system, the first error indication signal of the first burst ending signal includes a data pattern and a tail of burst to indicate the power mode change failure and to indicate closure of the first burst.

DETAILED DESCRIPTION OF THE INVENTION

To facilitate understanding of the object, characteristics and effects of this present disclosure, embodiments together with the attached drawings for the detailed description of the present disclosure are provided.

Regarding link configuration, the inventor observes that current power mode change procedure of two electronic devices of a communication system, such as that based on an interconnection protocol such as UniPro specification (e.g., UniPro version 2.0 or so on) may encounter un-synchronous states when one electronic device encounters a power mode change failure.

Regarding a power mode change procedure from the UniPro specification, in a normal case, in brief, the local PHY Layer is required to be configured with the requested parameters. The local PA Layer is required to close the burst on the outbound link. The peer PA Layer is required to close the burst on the other link when detecting the end of burst on its inbound link. Consequently, both directions of the Link have the new configuration activated. It is noted that the timing of burst closure is the time to update new configuration of power mode change.

The inventor observes that, however, if one side of the communication system successfully completes power mode change procedure but another side is not, un-synchronous states between the sides may occur.

Figure 1:
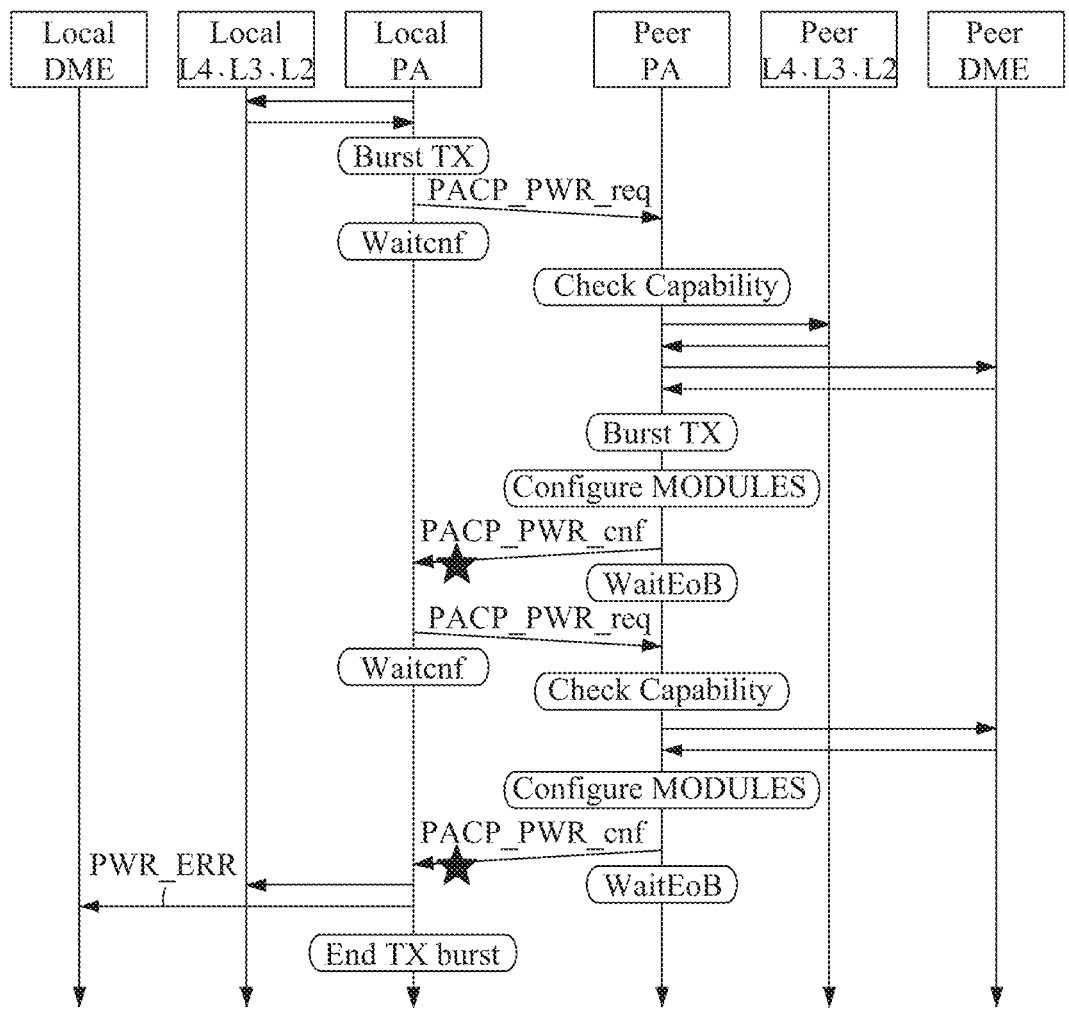
FIG. 1 (prior art) is a diagram illustrating an example of conventional error recovery of a power mode change procedure with errors.

In this regard, firstly, referring to FIG. 1, an example of conventional error recovery of a power mode change procedure with failure in a local side is shown. In FIG. 1, a local device and a remote device are performing a power mode change procedure according to UniPro version 2.0 specification, for example, wherein the transmitting path of the remote device has transmission problems. In FIG. 1, the local device is represented by its UniPro stack including a transport layer, a network layer, a data link layer (denoted by "Local L4, L3, L2"), a physical adapter layer (denoted by "Local PA"), and a device management entity (DME) denoted by "Local DME". Likewise, the remote device is represented by its UniPro stack, denoted by "Peer PA", "Peer L4, L3, L2", and "Peer DME". In addition, a frame transmission from a peer side to a local side, represented by an arrow with a "star" symbol, encounters an error, such as transmission errors or device errors.

FIG. 1 shows the failure for Power Mode Change with RESET Mode set to HS_MODE. The operations are shown as below by the local side's view, according to UniPro version 2.0, for example. A burst transmission (denoted by "Burst TX") is started. A physical adapter control protocol (PACP) frame, PACP_PWR_req frame, is transmitted in the burst. A request timer (referred to as PACP_REQUEST_TIMER) is set to a timer expiration value (referred to as PA_PACPReqTimeout). After that, the local PA layer waits for confirmation (e.g., indicated by "WaitCnf" in the Figures). On the other hand, after receiving the PACP_PWR_req frame, the peer side checks a power mode request against its inbound Link capabilities (denoted by "Check Capability"), wherein the power mode request, for example, may be a power mode configuration based on the PACP_PWR_req frame. If the power mode request is accepted, the peer PA layer configures the peer physical layer (denoted by "Configure MODULES") with parameters of the power mode request. After that, the peer PA layer transmits a PACP_PWR_cnf frame to the local side and then waits for an end of burst (e.g., denoted by "WaitEoB") from the local side. If a valid PACP_PWR_cnf frame is not received before PACP_REQUEST_TIMER expires, the local PA Layer transmits a deskew pattern and transmits the PACP_PWR_req frame again. PACP_REQUEST_TIMER is set to PA_PACPReqTimeout. If a valid PACP_PWR_cnf frame is not received before PACP_REQUEST_TIMER expires, the local PA Layer is to abort the power mode request, and pass a primitive indicated by PWR_ERR (e.g., a primitive with a result code denoted by PA_LM_PWR_MODE_CHANGED.ind(PWR_FATAL_ERROR), as described in UniPro version 2.0) to the DME. The local PA layer will close the burst. If a PACP_PWR_cnf frame is received successfully with a result code of success (e.g., PWR_OK), the local PA Layer closes the burst and sets PACP_REQUEST_TIMER to a timer expiration value (or period) of waiting for an end of burst (e.g., PA_PACPReqEoBTimeout). If the peer PA Layer does not close the burst within this period, the local PA Layer is to abort the power mode request and pass PA_LM_PWR_MODE_CHANGED.ind(PWR_FATAL_ERROR) to the DME.

Figure 2A:
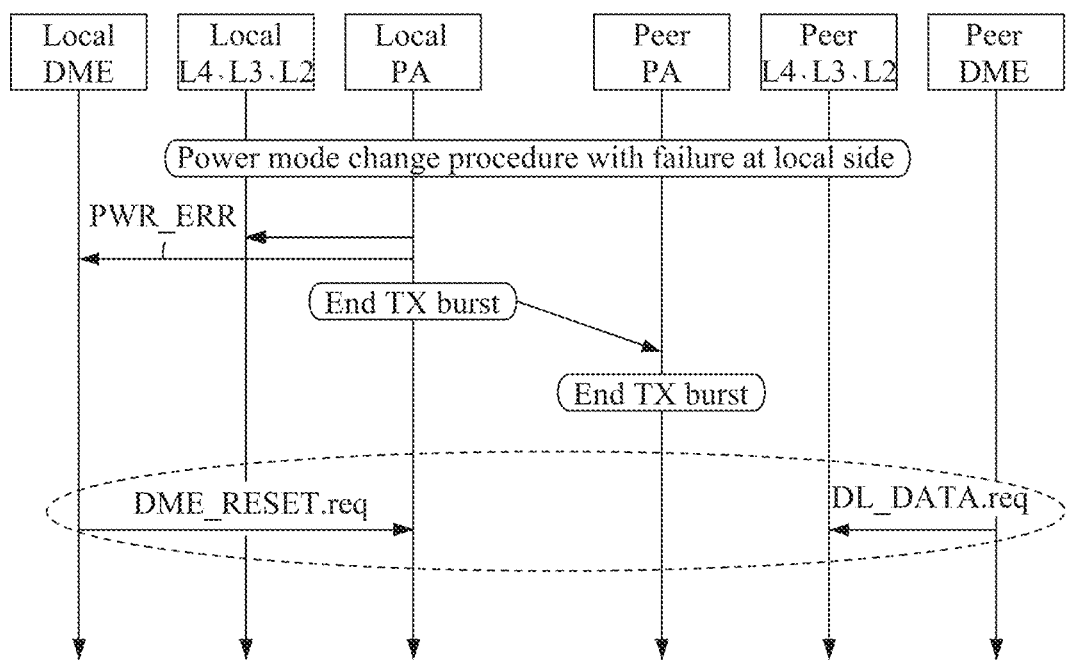
FIG. 2A is a diagram illustrating an example of operation collision that may follow a power mode change procedure with errors.

Referring to FIG. 2A, an example of a power mode change procedure with RESET Mode set to HS_MODE having failure in the local side is shown with subsequent operations. As shown in FIG. 2, in addition to the operations described in the UniPro specification, the inventor observes that in practical applications, although the local side has been idle and issues PA_LM_PWR_MODE_CHANGED.ind(PWR_FATAL_ERROR) to an application layer though its DME, the peer side closes the burst and may probably treat the power mode change procedure in the peer side as a successful one so that both sides enter different operation states (or referred to as un-synchronous states). As shown in FIG. 2A, after issuing the error event to the application layer, the local side is requested to reset by its DME with primitive DME_RESET.req while the peer side has entered another power mode and is requested by its DME to begin transmitting DL data frames. This situation might cause operation collision as indicated by a dashed ellipse in FIG. 2A when the local side tries to do error recovery and the peer side tries to transmit PACP frame or TCx data frame (where TCx represents traffic class 1 (TC1) or traffic class 0 (TC0)).

Figure 2B:
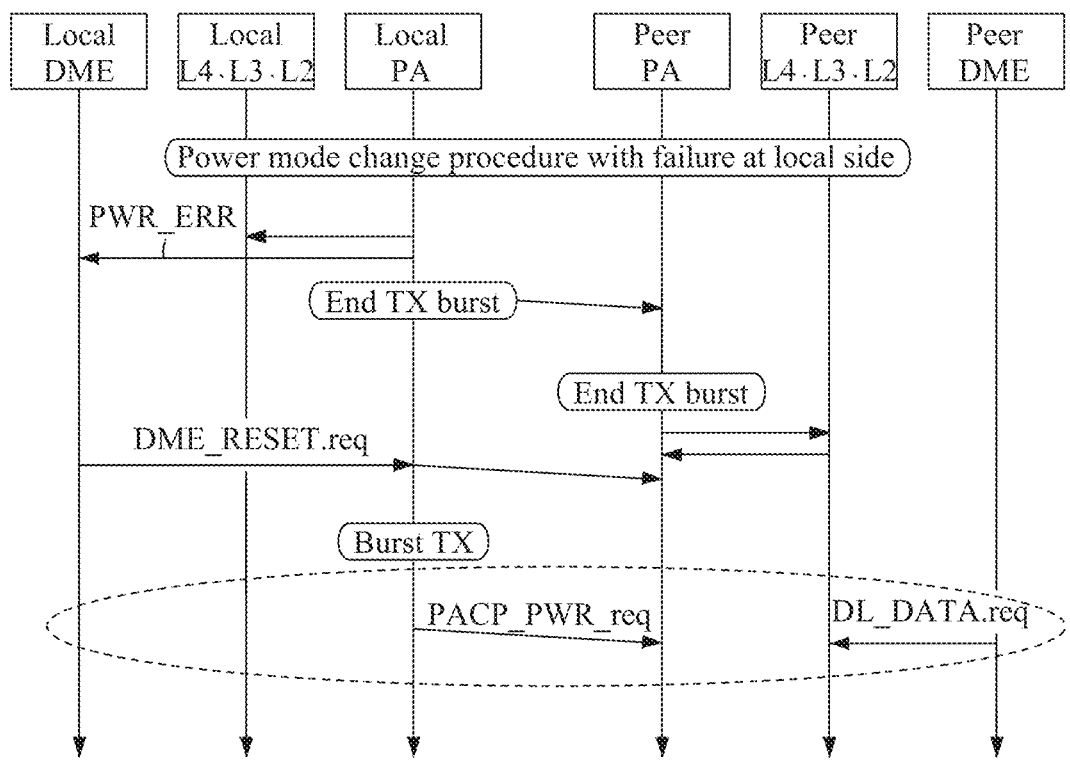
FIG. 2B is a diagram illustrating another example of operation collision that may follow a power mode change procedure with errors.

Referring to FIG. 2B, another example of a power mode change procedure with RESET Mode set to LS_MODE having failure in the local side is shown with subsequent operations. The situation of FIG. 2B is similar to that of FIG. 2A. As shown in FIG. 2B, after issuing the error event to the application layer, the local side is requested to reset by its DME with primitive DME_RESET.req and even begins to transmit a request frame (PACP_PWR_req) while the peer side has entered another power mode and is requested by its DME to begin transmitting DL data frames. This situation might cause operation collision as indicated by a dashed ellipse in FIG. 2B when Local side tries to do error recovery and peer side tries to transmit PACP Frame or TCx data frame.

With respect to the issues as described above, the inventor observes that two electronic devices in a communication system may enter un-synchronous states when one electronic device encounters a power mode change failure for a power mode configuration during a power mode change procedure but another electronic device activates such a power mode configuration so that un-synchronous states may occur between the electronic devices. In this regards, in the present disclosure, technologies for error recovery of power mode change to avoid un-synchronous states of a communication system are provided. The technologies are suitable to implement in various embodiment as methods of a device in a power mode change operation, electronic devices, and communication systems. An electronic device which encounters a power mode change failure is capable of notifying another electronic device of the power mode change failure by using a burst ending signal to abort a power mode configuration obtained during the power mode change procedure to avoid the undesirable un-synchronous states.

Figure 3:
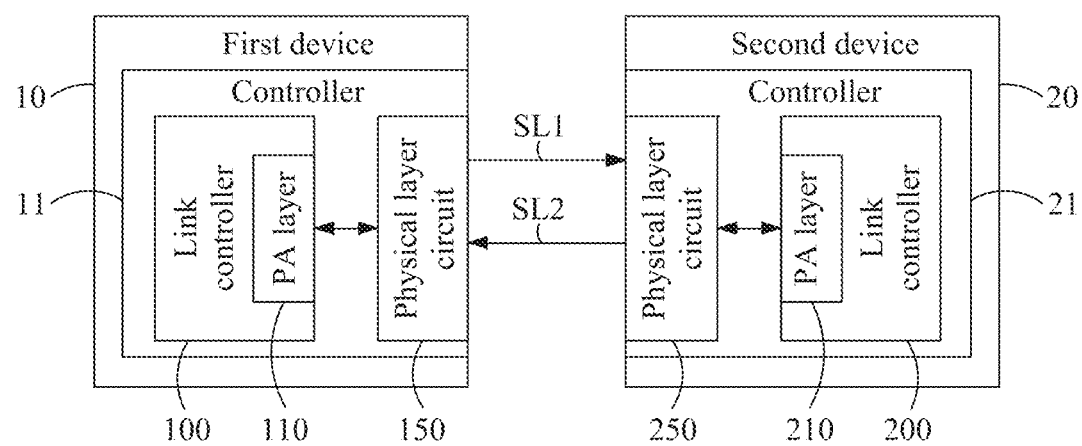
FIG. 3 is a diagram illustrating an embodiment of a communication system capable of communication according to an interconnection protocol.

FIG. 3 illustrates an embodiment of a communication system capable of communication according to an interconnection protocol. The interconnection protocol may be based on a modified UniPro specification, a modified UFS system, or other related communication protocols or specifications, and so on, whenever appropriate. The communication system, for example, includes a first device 10 and a second device 20, which can be a local host and a remote device respectively, or vice versa. In FIG. 3, the first device 10 includes a link controller 100 and a physical layer circuit 150, which may be implemented as a controller 11. Likewise, the second device 20 includes a link controller 200 and a physical layer circuit 250, which may be implemented as a controller 21. The link controller 100 of the first device 10 for example implements a protocol layer (or "link layer," with respect to the physical layer such as M-PHY) such as a modified UniPro including a physical adapter (PA) layer 110; and likewise, the link controller 200 of the second device 20 for example also implements the protocol layer (or "link layer") such as a modified UniPro including a physical adapter (PA) layer 210. The first device 10 is capable of communicating with the second device 20 via a link including at least one data lane SL1 and at least one data lane SL2, which are bidirectional, according to the interconnection protocol. For example, the interconnection protocol is applicable to a wide range of device types (e.g., for first device or second device) such as application processors, co-processors, modems, storage subsystems including non-volatile memory modules, displays, camera sensors, 3D graphics and multimedia accelerators, chips, and so on. It is also applicable to different types of data traffic such as control messages, bulk data transmission and packetized streaming. Other related MIPI alliance specifications or other related specifications can also be used for implementation of the physical layer or application layer, whenever appropriate.

For example, the first device 10 and the second device 20 communicate through bursts opened (or referred to as started) on respective data lanes (or simply called lanes). In terms of signal transmission, a burst indicates a data sequence, which includes a start-of-burst (SOB), data to be transmitted, and a tail-of-burst (TOB). For example, the SOB can be a specific bit pattern or signal level pattern which indicates a start of a burst and the data can be transmitted after the SOB. A burst from the first device 10 to the second device 20 can be opened (or started) on a data lane (e.g., SL1) by a transmitter module (e.g., transmitter 1111 in FIG. 12) of the physical layer circuit 150 transmitting an SOB to a receiver module (e.g., receiver 1212 in FIG. 12) of the physical layer circuit 250. After the receiver module of the physical layer circuit 250 receives and detects the SOB, both the first device 10 and the second device 20 can enter a burst state. In terms of operation states of the transmitter or receiver module, the burst state is a state in which data transmission and reception can be performed effectively. According to the interconnection protocol, the first device 10 is capable of transmitting data to the second device 20 in the burst, wherein the data may be a physical adapter control protocol (PACP) frame, a data link (DL) layer frame, or so on. The first device 10 can further close (or end) the burst by transmitting a TOB. The TOB is another specific bit pattern or signal level pattern, which indicates a tail of the burst so that both the first device 10 and the second device 20 exit the burst state and enter a power saving state. In the similar manners as mentioned above, a burst from the second device 20 to the first device 10 can be opened (or started) by a transmitter module (e.g., transmitter 1211 in FIG. 12) of the physical layer circuit 250 transmitting a SOB to a receiver module (e.g., receiver 1112 in FIG. 12) of the physical layer circuit 150 on a data lane (e.g., SL2); data transmission and reception can be performed in the burst effectively; and the burst can be closed. In addition, a SOB or TOB of a burst can be implemented based on related portions described in M-PHY specification, for example. In some embodiments, any pattern or signal level pattern can be used to realize a SOB or TOB, whenever appropriate, as long as both the transmitter and receiver modules are consistent in adopting the pattern.

In the present disclosure, various embodiments for facilitating error recovery operations for a power mode change procedure in an interconnection protocol are provided below to avoid un-synchronous states when an error event occurs in one side of a communication system. Accordingly, the efficiency of the power mode change procedure when an error event occurs can be enhanced.

Figure 4:
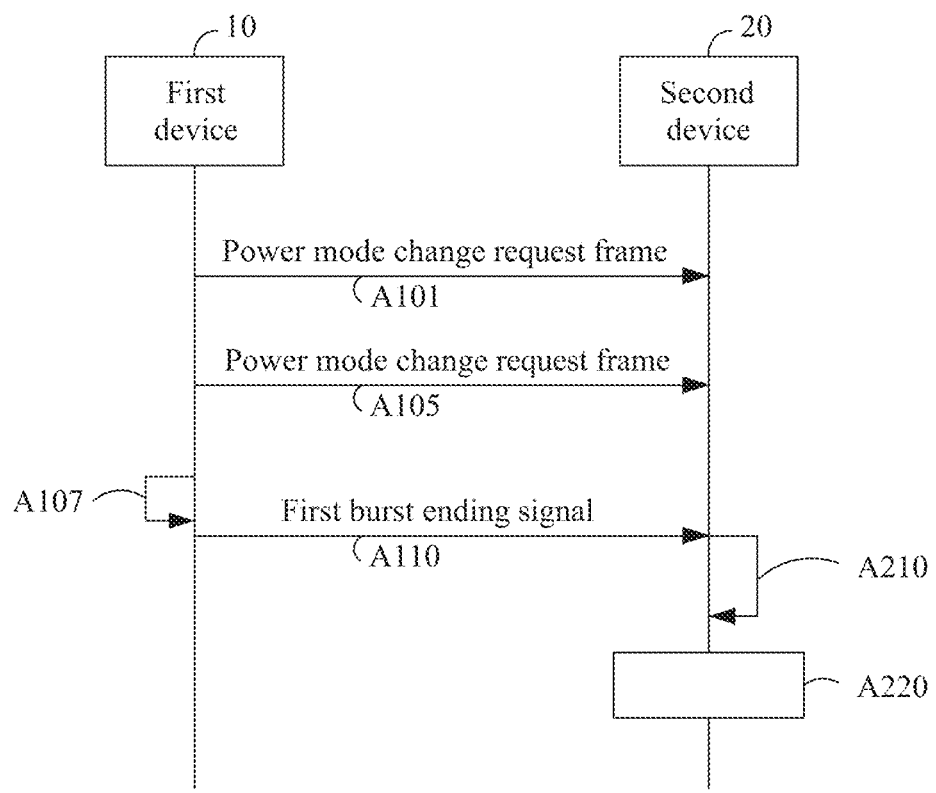
FIG. 4 is a diagram illustrating an embodiment of an operation flow of a power mode change procedure with errors.

FIG. 4 illustrates an embodiment of an operation flow of facilitating error recovery operations for the power mode change procedure when an error event occurs. In FIG. 4, the operations are performed during the power mode change procedure in particular when an error event such as power mode change failure occurs. For the sake of illustration, it is assumed that the first device 10 has such an error event. Certainly, the operation flow or related embodiments can be applied to another device whenever appropriate.

In operation A101, the first device 10 transmits a power mode change request frame for a power mode configuration. For example, a timer may be set for the power mode change request frame with an expiration time. In response, the second device 20 may receive the power mode change request frame and perform associated operations and then transmits a confirmation frame to the first device 10. However, the first device 10 cannot receive the confirmation frame due to communication problems of the transmitting path of the second device 20 or the receiving path of the first device 10, or other communication problems.

In operation A105, the first device 10 transmits a power mode change request frame for the power mode configuration again. For example, the first device transmits this frame again because the timer expires after the expiration time. For example, in this time, the second device 20 receives the power mode change request frame, performs associated operations, and then transmits a confirmation frame again to the first device 10. However, the first device 10 still cannot receive the confirmation frame.

In operation A107, the first device 10 detects that a power mode change failure occurs, for example, because the timer associated with the power mode change request frame expires and number of retry of transmission of the power mode change request frame reaches a threshold (e.g., 1, 2, or so on). The first device 10 can be configured to detect whether a power mode change failure occurs by determining whether the timer associated with the power mode change request frame expires and number of retry of transmission of the power mode change request frame reaches a threshold (e.g., 1, 2, or so on). In response to the power mode change failure, operation A110 is performed. In operation A110, the first device 10 transmits a first burst ending signal in a first burst to notify a peer side of a power mode change failure in the first device 10 and to indicate closure of the first burst, wherein the first burst ending signal includes a first error indication signal to indicate the power mode change failure.

In operation A210, the second device 20 receives the first burst ending signal. For example, the second device 20 detects that the first burst ending signal indicates burst closure and includes the first error indication signal to indicate the power mode change failure in the first device 10.

In operation A220, the second device 20, in response to the detected first burst ending signal, accepts the power mode change failure in the first device to abort the power mode configuration obtained during the power mode change procedure and to end the first burst.

Figure 5A:
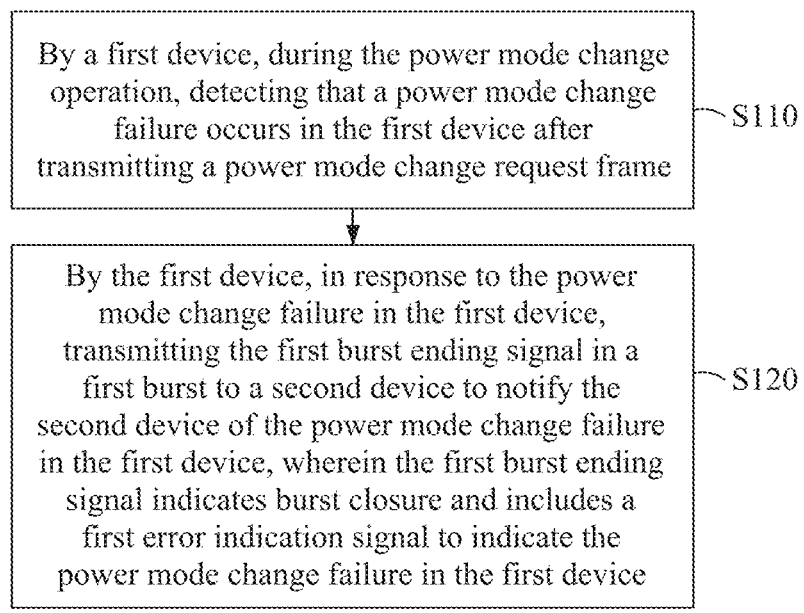
FIG. 5A is a flowchart illustrating an embodiment of a method for a device in a power mode change operation with respect to a first device according to FIG. 4.

FIG. 5A illustrates an embodiment of a method for a device in a power mode change operation with respect to a first device according to FIG. 4. The method of FIG. 5A includes operations S110 and S120, which are associated with the operations A107 and A110 of FIG. 4.

In the operation S110, by a first device (e.g., first device 10 in FIG. 3 or FIG. 4), during the power mode change operation, it is detected that a power mode change failure occurs in the first device after transmitting a power mode change request frame.

In the operation S120, by the first device, in response to the power mode change failure in the first device, the first burst ending signal is transmitted in a first burst to a second device (e.g., second device 20 in FIG. 3 or FIG. 4) to notify the second device of the power mode change failure in the first device, wherein the first burst ending signal indicates burst closure and includes a first error indication signal to indicate the power mode change failure in the first device.

Figure 5B:
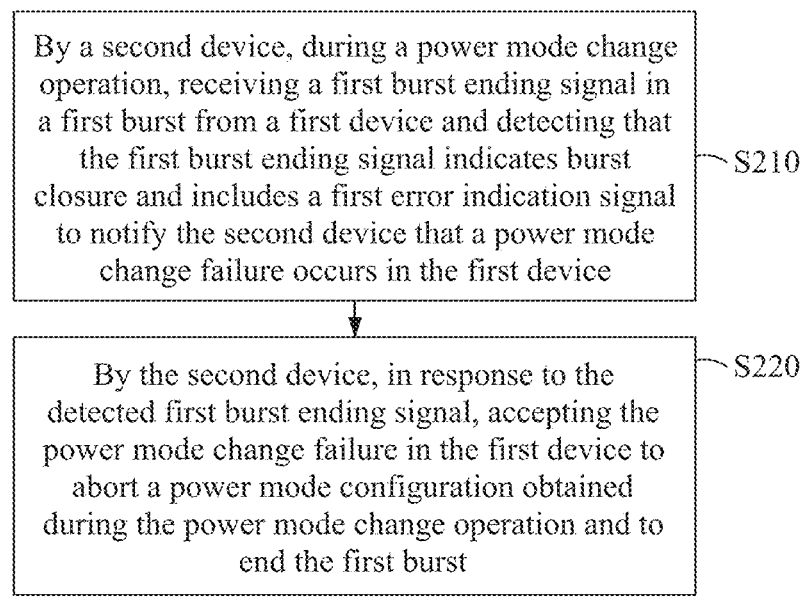
FIG. 5B is a flowchart illustrating an embodiment of a method for a device in a power mode change operation with respect to a second device according to FIG. 4.

FIG. 5B illustrates an embodiment of a method for a device in a power mode change operation with respect to a second device according to FIG. 4. The method of FIG. 5B includes operations S210 and S220, which are associated with the operations A210 and A220 of FIG. 4.

In the operation S210, by the second device (e.g., second device 20 in FIG. 3 or FIG. 4), during the power mode change operation, a first burst ending signal is received in a first burst from a first device (e.g., first device 10 in FIG. 3 or FIG. 4) and it is detected that the first burst ending signal indicates burst closure and includes a first error indication signal to notify the second device that a power mode change failure occurs in the first device.

In the operation S220, by the second device, in response to the detected first burst ending signal, the power mode change failure in the first device is accepted to abort a power mode configuration obtained during the power mode change operation and to end the first burst.

The operation flow according to FIG. 4 and its related embodiments, such as FIG. 5A or 5B, facilitates the power mode change procedure when an error event occurs on the first device and can avoid undesirable the un-synchronous states, as mentioned above.

The operation flow according to FIG. 4 and its related embodiments, such as FIG. 5A or 5B, can further include one or more operations to facilitate the power mode change procedure when an error event occurs on the first device.

In some embodiments, by the first device, the first burst ending signal is transmitted in the first burst to the second device to notify the second device of the power mode change failure in the first device so that the second device is capable of accepting the power mode change failure in the first device to abort a power mode configuration obtained during the power mode change operation and to end the first burst.

In some embodiments, the first error indication signal of the first burst ending signal includes a data pattern to indicate the power mode change failure in the first device.

In some embodiments, the first burst ending signal includes a specific data pattern having at least two control symbols to notify the second device of the power mode change failure in the first device, wherein the control symbol can be a MARKER2 symbol (denoted by MK2) defined in the M-PHY specification (e.g., version 5.0). By contrast, as described in the UniPro specification (e.g., version 2.0), when ending a burst, the PA layer is required to perform operations including transmitting one MARKER2 symbol (i.e., an M-PHY End-of-Burst marker). The UniPro specification is silent on notifying a remote side of a power mode change failure on a host side.

In some embodiments, the first error indication signal of the first burst ending signal includes a tail of burst to indicate the power mode change failure in the first device and to indicate closure of the first burst.

In some embodiments, the first error indication signal of the first burst ending signal includes a data pattern and a tail of burst, to indicate the power mode change failure in the first device and to indicate closure of the first burst.

In some embodiments, the first burst ending signal includes a tail of burst and without a control symbol (e.g., MARKER2), to notify the second device of the power mode change failure in the first device and to indicate closure of the first burst. For example, the tail of burst for indicating the power mode change failure and burst closure can be implemented as a data sequence or signal that is different from TAIL-OF-BURST (TOB) defined in the M-PHY specification (e.g., version 5.0).

In some embodiments according to FIG. 5B, the method further comprises the following step. By the second device, in response to the detected first burst ending signal, a power mode change failure in the first device is reported to a protocol layer (e.g., PA layer, DL layer, or DME) of the second device after the first burst from the first device to the second device is closed.

In some embodiments according to FIG. 5B, the method further comprises the following step. By the second device, in response to the first burst ending signal, a physical layer circuit of the second device is enabled to keep a current power mode configuration. Compared to the current power mode configuration, the power mode configuration obtained and temporarily stored in a buffer during the power mode change operation has not been effectuated and is aborted, as indicated by the operation S220 of FIG. 5B. The buffer, for example, can be shadow registers (or INLINE-CR registers) as described in M-PHY specification version 5.0. In addition, the current power mode configuration which is actually stored in inline registers (e.g., status registers (or INLINE-SET registers) as described in M-PHY specification version 5.0) of the physical layer circuit of the second device is kept and effectuated again.

In some embodiments according to FIG. 5B, the method further comprises the following step. By the second device, after the physical layer circuit of the second device keeps current power mode configuration and the first burst is closed, transmitted is a second burst ending signal which indicates burst closure and includes a second error indication signal to notify the first device that a power mode change failure occurs in the second device.

Figure 6:
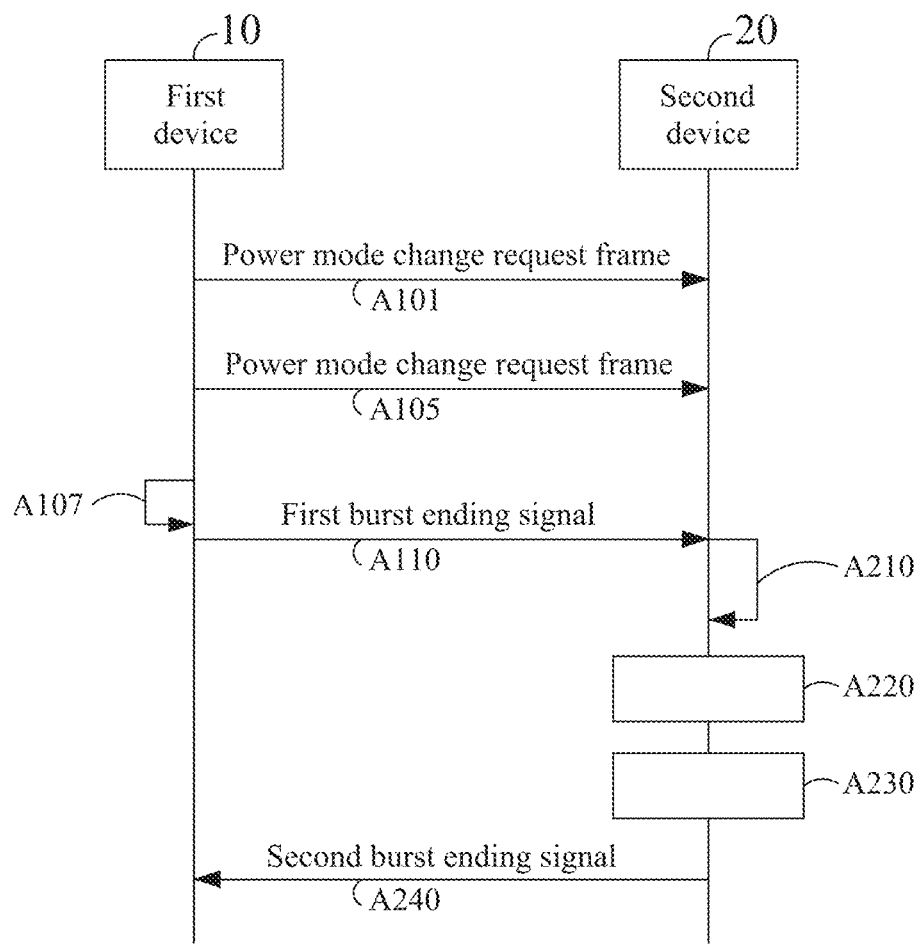
FIG. 6 is a diagram illustrating another embodiment of an operation flow of a power mode change procedure with errors.

FIG. 6 illustrates another embodiment of the operation flow according to FIG. 4 and some embodiments of the method of FIG. 5A or 5B to further include at least one operation such as operation A230 and A240. The operation A230 indicates that a physical layer circuit of the second device is enabled to keep the current power mode configuration and/or the power change mode failure in the second device is reported to an upper protocol layer. The operation A240 indicates transmitting a second burst ending signal which indicates burst closure and includes a second error indication signal to notify the first device that a power mode change failure occurs in the second device. Certainly, the method or related embodiments can be applied to the first device when an error event occurs on the second device whenever appropriate.

Various embodiments are provided below for facilitating power mode change procedure, and are suitable for an electronic device capable of communicating with another electronic device according to the interconnection protocol. The interconnection protocol can be derived from the UFS standard or UniPro specification. For example, a conventional UFS system includes a UFS host and a UFS device. The UFS host and the UFS device communicate each other through respective UFS Interconnect (UIC) layer including UniPro and M-PHY. Accordingly, the interconnection protocol can be implemented and derived from architecture of the conventional UFS system by using a modified UFS system implementing a modified version of UniPro and a modified version of M-PHY for providing new high-speed modes or using an advanced signaling scheme.

In the following embodiments, the UniPro specification such as UniPro version 2.0 is taken as examples. For the sake of illustration, the first device 10 can also be referred as a requester and the second device 20 can be referred as a responder. Certainly, the implementation of the disclosure is not limited thereto.

The methods of facilitating error recovery illustrated in FIG. 4, FIG. 5A, FIG. 5B, FIG. 6, or related embodiments can be regarded as operation methods of a local host or remote device in a variety of operation flows for error recovery of power mode change procedure that may be encountered in practical scenarios. Regarding this, scenarios involving error recovery of power mode change procedure are illustrated in the examples (e.g., FIG. 7, FIG. 8A, or FIG. 8B) below.

Figure 7:
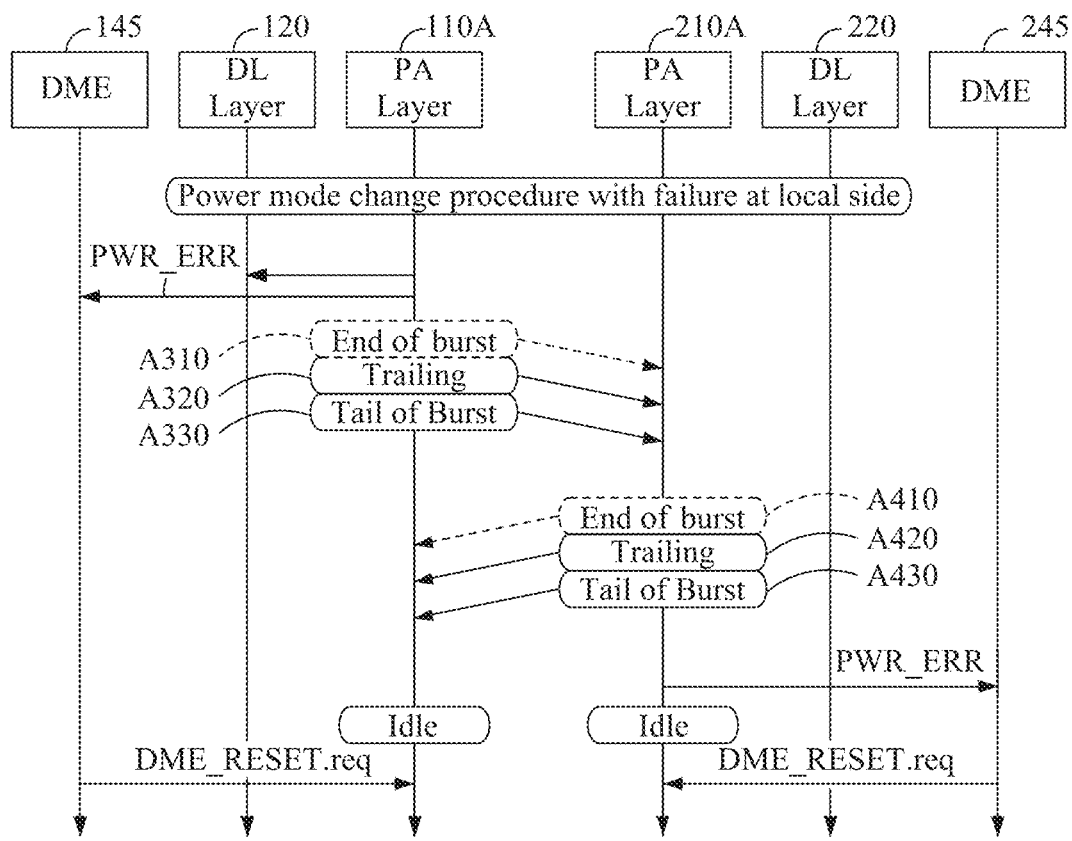
FIG. 7 is a diagram illustrating an embodiment of an operation flow of error recovery of a power mode change to avoid un-synchronous states.

Before discussion of FIG. 7, FIG. 8A, or FIG. 8B, some assumptions are mentioned as follows. In FIG. 7 or similar Figures such as FIG. 8, a local host, such as the first device 10, can be represented by its UniPro stack including a physical adapter (PA) layer 110A, a data link (DL) layer 120, and a device management entity (DME) 145, which can be implemented as modules in the first device 10. Likewise, a remote device, such as the second device 20, can be represented by its UniPro stack including a PA layer 210A, a DL layer 220, and a DME 245, which can be implemented as modules in the second device 20. The PA layer 110A or 210A in FIG. 7, FIG. 8A, or FIG. 8B and so on can be regarded as embodiments of the PA layer 110 or 210 in FIG. 3. In addition, a dashed symbol such as a block or an arrow in the Figures to indicate that an associated operation may be optional.

FIG. 7 illustrates an embodiment of an operation flow of error recovery of a power mode change procedure to avoid un-synchronous states. As indicated in FIG. 7, the power mode change procedure has a failure on the local side. For example, on the requester side, (local device or first device 10), an expected confirmation frame is not received from the responder (remote device or second device 20) because of communication problems of the transmitting path of the second device 20 or the receiving path of the first device 10, or other communication problems (e.g., as described in FIG. 1 or so on). According to operation S110 of FIG. 5A, the requester detects that a power mode change failure occurs in the requester after transmitting a power mode change request frame. During the power mode change procedure, the power mode change request frame including the same power mode configuration parameters such as Device ID, Adapt, Flags, Mode, Lane, Gear, can be transmitted for one or two times, according to requirement for error recovery of the first device 10. In a case, an associated request timer for the request frame expires, wherein an associated confirmation frame from the second device 20 has not been received. For example, the power mode change request frame (e.g., PACP_PWR_req) includes the power mode configuration parameters such as DevID (device ID), Adapt, Flags, TxMode, TxLane, TxGear, RxMode, RxLane, RxGear wherein a UserData Valid flag of the Flags is set to '1', as described in UniPro specification (version 2.0) or so on.

According to operation S120 of FIG. 5A, in response to the power mode change failure in the first device 10, the first device 10 transmits a first burst ending signal in a first burst to a second device (e.g., second device 20 in FIG. 3 or FIG. 4) to notify the second device 20 of the power mode change failure in the first device 10.

The first burst ending signal indicates burst closure and includes a first error indication signal to indicate the power mode change failure in the first device. For example, the first burst ending signal includes an "end of burst" signal, a "trailing" signal, and a "tail of burst" signal. For example, the end of burst signal may include one or more symbols (e.g., data pattern) to indicate burst closure; for example, the first burst (e.g., an outbound burst) is going to end. The trailing signal may include one or more symbols (e.g., data pattern such as FILLER symbol or so on) lasting for a time interval which is required by both the requester side and the responder side for decoding purpose on the responder side.

The tail of burst signal indicates the tail of the burst with its one or more specific signal levels for an associated time period. In FIG. 7, an end of burst signal, a trailing signal, and a tail of burst signal of the first burst ending signal are transmitted to the second device 20, respectively, as illustrated by operations A310, A320, and A330. In some examples, the end of burst signal or the tail of burst signal, or both of the end of burst signal and tail of burst signal may be configured to serve as the first error indication signal to indicate the power mode change failure in the first device.

In some embodiments, the first error indication signal of the first burst ending signal includes a data pattern to indicate the power mode change failure in the first device. For example, the first burst ending signal includes a specific data pattern having at least two control symbols of the M-PHY specification (e.g., two MARKER2 symbols denoted by <MK2, MK2>) to notify the responder side of the power mode change failure in the first device 10.

In some embodiments, the first error indication signal of the first burst ending signal includes a tail of burst to indicate the power mode change failure in the first device and to indicate closure of the first burst.

In some embodiments, the first error indication signal of the first burst ending signal includes a data pattern and a tail of burst, to indicate the power mode change failure in the first device and to indicate closure of the first burst.

In some embodiments, the first burst ending signal includes a tail of burst and without a MARKER2 control symbol of the M-PHY specification to notify the second device of the power mode change failure in the first device and to indicate closure of the first burst.

According to the operation S210 of FIG. 5B, during the power mode change operation, the second device 20 receives a first burst ending signal in the first burst from the first device 10 and detects that the first burst ending signal indicates burst closure and includes a first error indication signal to notify the second device that a power mode change failure occurs in the first device 10. For example, during the power mode change procedure, before receiving a first burst ending signal, the second device 20 may receive the power mode change request frame including the same power mode configuration parameters such as Device ID, Adapt, Flags, Mode, Lane, Gear, for one or two times, which are compliant with requirement for error recovery of the first device 10. The second device 20 may thus accept the power mode change request frame and treat the obtained power mode configuration associated with the power mode change request frame as the one with which inline registers (e.g., which making the power mode change actually operate) of the physical layer circuit is going to update.

According to the operation S220 of FIG. 5B, in response to the detected first burst ending signal, the second device 20 accepts the power mode change failure in the first device 10 so that the second device 20 aborts the power mode configuration obtained during the power mode change operation and ends the first burst. Accordingly, on the responder side, the second device 20 is capable of being notified without updating the physical layer circuit with the power mode configuration obtained during the power mode change operation, so as to avoid un-synchronous states (e.g., situations in FIG. 2A or FIG. 2B) of the first device 10 and second device 20.

As shown in FIG. 7, the second device 20 can further close its outbound burst (e.g., called a second burst) by transmitting a second burst ending signal which indicates burst closure and includes a second error indication signal to notify the first device that a power mode change failure occurs in the second device. For example, a second burst ending signal may include an "end of burst" signal, a "trailing" signal, and a "tail of burst" signal and can be implemented, similar to the first burst ending signal as described in the examples above. In FIG. 7, the end of burst signal, trailing signal, and tail of burst signal of the second burst ending signal are transmitted to the first device 10, respectively, as illustrated by operations A410, A420, and A430. For the sake of brevity, the implementation of the second burst ending signal will not be repeated.

In some embodiments, the responder side can respond to the first burst ending signal of the requester side by accepting the power change mode failure in the requester side when detecting the first error indication signal indicating the power mode change failure.

Figure 8A:
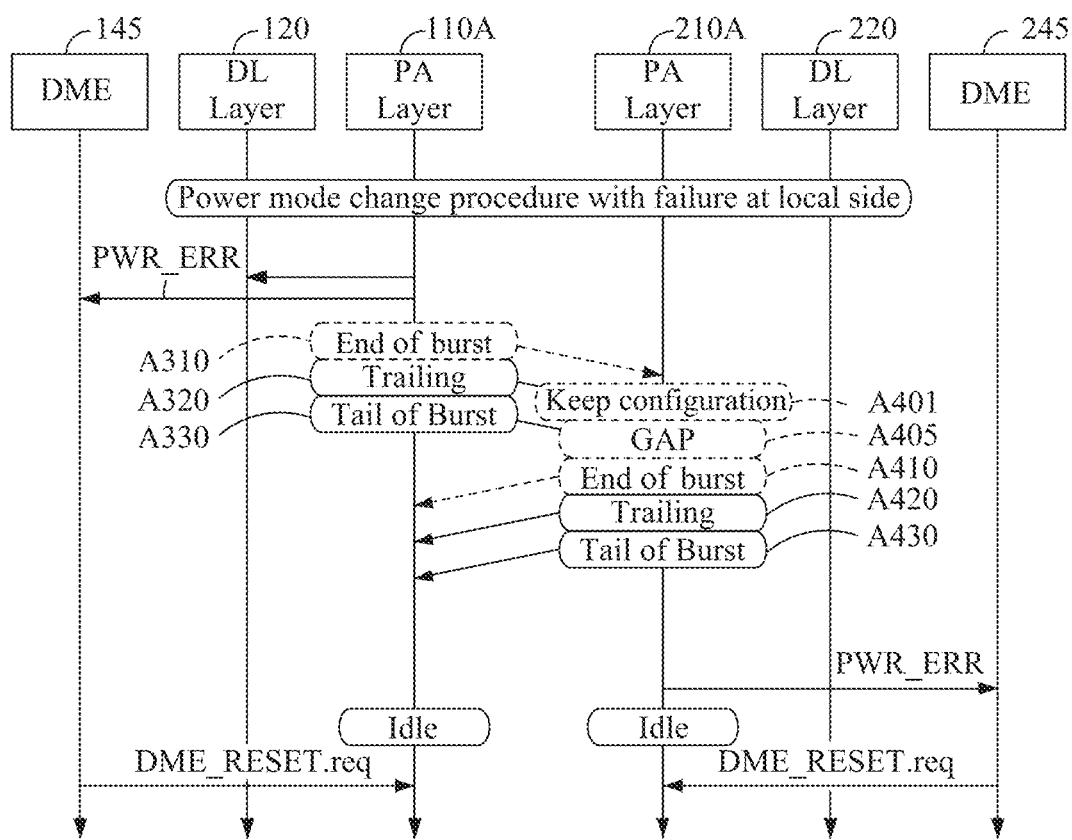
FIG. 8A is a diagram illustrating another embodiment of an operation flow of error recovery of a power mode change to avoid un-synchronous states.

FIG. 8A illustrates another embodiment of an operation flow of error recovery of power mode change to avoid un-synchronous states. In this embodiment, the assumptions are as same as those of the embodiment of FIG. 7. In addition, in the embodiment of FIG. 8A, the end of burst signal is configured to serve as the first error indication signal to indicate the power mode change failure in the first device 10. Accordingly, as shown in FIG. 8A, after the second device 20 receives the end of burst signal from the first device 10, as indicated by an arrow associated with the operation A310, the PA layer 210A of the second device 20 accepts the power mode change failure in the first device 10 to abort a power mode configuration obtained during the power mode change procedure. Specifically, the PA layer 210A of the second device 20 enables modules (e.g., the associated physical layer circuit) to keep a current power mode configuration, as indicated by operation A401. Then, optionally, in operation A405, the PA layer 210A waits for a time interval (indicated by "GAP") to avoid race condition (e.g., as described in UniPro version 2.0), in particular for new power mode configuration update. After that, the second device can further close its outbound burst (e.g., called a second burst) by transmitting a second burst ending signal, as indicated by operation A410, A420, and A430.

Figure 8B:
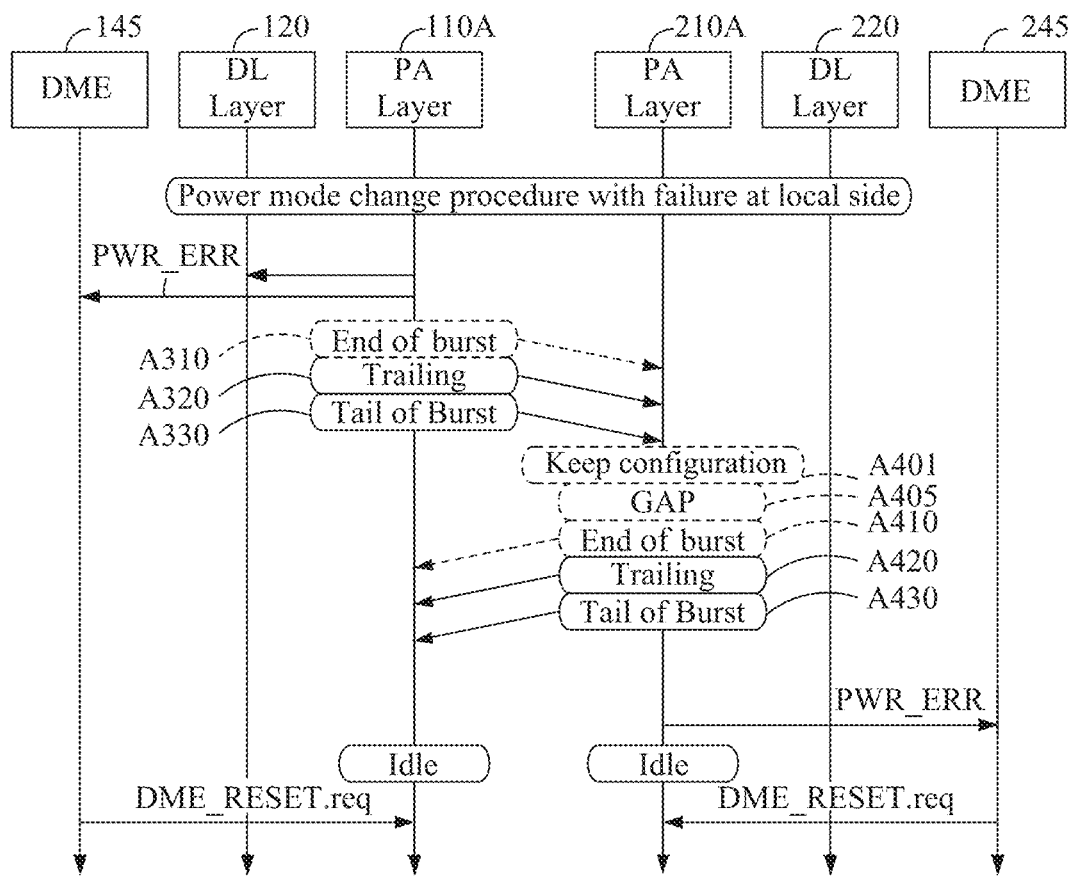
FIG. 8B is a diagram illustrating another embodiment of an operation flow of error recovery of a power mode change to avoid un-synchronous states.

FIG. 8B illustrates another embodiment of an operation flow of error recovery of power mode change to avoid un-synchronous states. In this embodiment, the assumptions are as same as those of the embodiment of FIG. 8A. The main difference between the embodiments of FIG. 8A and FIG. 8B is that in the embodiment of FIG. 8B, the tail of burst signal is configured to serve as the first error indication signal to indicate the power mode change failure in the first device and to trigger the second device 20 to perform operations in response to the first error indication signal. Accordingly, as shown in FIG. 8B, after the second device receives the tail of burst signal from the first device 10, as indicated by an arrow associated with the operation A330, the PA layer 210A of the second device 20 accepts the power change failure in the first device 10 to abort a power mode configuration obtained during the power mode change procedure. Specifically, the PA layer 210A performs operations A401 and A405. After that, the second device 20 performs operation A410, A420, and A430 to close its outbound burst (e.g., a second burst).

In some embodiments, the tail of burst signal can be implements by signal levels with specific time intervals, which can also be regarded as a data pattern. To this end, TABLE 1 shows examples of BURST Closure Conditions (TAIL-OF-BURST). There may be a new defined pattern for new "tail of burst" to serve as an error indication signal (e.g., first or second error indication signal) to indicate a power mode change failure in a device (e.g., first or second device).

TABLE 1

| MODE | MODULE | LINE Condition (Return to SAVE state) | State | Comments |
|---|---|---|---|---|
| HS | M-TX | DIF-N for 20 $UI_{HS}$ | STALL | ToB for Power Mode Change |
| HS | M-RX | DIF-N for 9 to 20 $UI_{HS}$ | STALL | ToB for Power Mode Change |
| HS | M-TX | DIF-P for 20 $UI_{HS}$ + DIF-N for 20 $UI_{HS}$ | STALL | New ToB for additionally indicating Power Mode Change Failure |
| HS | M-RX | DIF-P for 9 to 20 $UI_{HS}$ + DIF-N for 9 to 20 $UI_{HS}$ | STALL | New ToB for additionally indicating Power Mode Change Failure |

In TABLE 1, a high-speed (HS) unit interval (UI), denoted by $UI_{HS}$, is defined as $UI_{HS}=1/DR_{HS}$, where $DR_{HS}$ is a high speed data rate, as described in M-PHY specification (M-PHY version 5.0 or so on). DIF-N is a logical LINE state corresponding with a negative differential LINE voltage and DIF-P is a logical LINE state corresponding with a positive differential LINE voltage. The logical LINE state or other related states can be driven by an M-TX or M-RX (e.g., a transmitter or receiver respectively described in M-PHY specification). For example, voltage levels and signal transition timing specifications for the M-TX as well as detection requirement for the M-RX are described in M-PHY specification (e.g., M-PHY version 5.0 or so on). For example, a transmitter transmits a tail of burst signal based on an example of TABLE 1 having a signal level pattern (e.g. DIF-N) for a specific time interval (e.g., 20 $UI_{HS}$ or so on) to indicate a tail of burst (ToB) for power mode change. In another example, a tail of burst signal can be transmitted based on another example of TABLE 1 having a signal level pattern with a first signal level (e.g. DIF-P) for a first specific time interval (e.g., 10 $UI_{HS}$ or so on) and a second signal level (e.g. DIF-N) for a second specific time interval (e.g., 10 $UI_{HS}$ or so on) to additionally indicate a tail of burst (ToB) for a power mode change failure. A tail of burst signal can also be defined by other signal level pattern so long as both the transmitter and its associated receiver are consistent in adopting the signal level pattern for the tail of burst signal. In addition, the BURST Closure Condition as indicated in TABLE 1 is transmitted for exit to a power saving state (e.g., a SAVE state, such as a STALL state, as described in M-PHY specification). Certainly, the implementation of the embodiments is not limited to the examples. In some embodiments, the tail of burst (ToB) signal for additionally indicating power mode change failure can be implemented in other signal level patterns or voltage levels, whenever appropriate.

Figure 9:
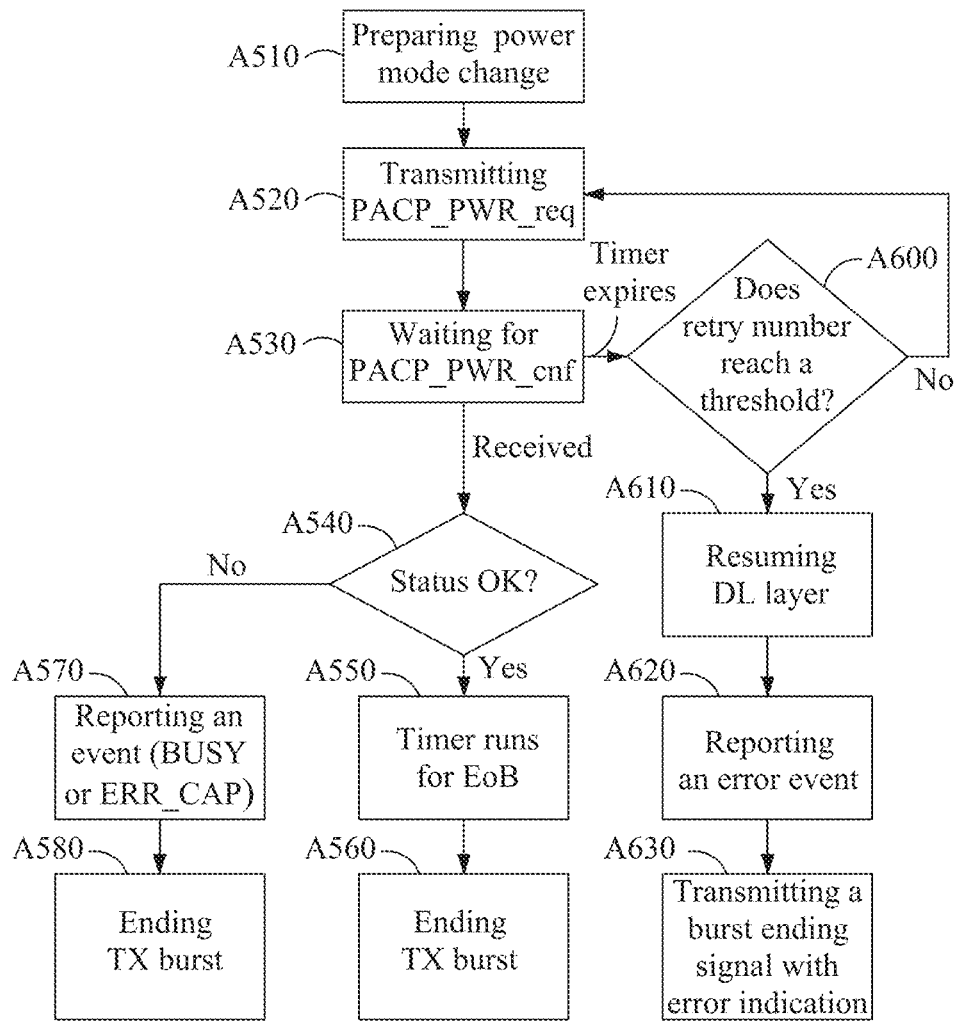
FIG. 9 is a diagram illustrating an embodiment of an operation flow of error recovery of power mode change with respect to a requester.

FIG. 9 illustrates an embodiment of an operation flow of error recovery of power mode change with respect to a requester (e.g., first device 10 or second device 20). FIG. 9 can be implemented as a finite state machine operable in an electronic device (such as the first device 10 or second device 20; or both of them).

In operation A510, the requester performs operations for preparing power mode change.

In operation A520, the requester transmits a power mode change request frame (e.g., PACP_PWR_req as described in UniPro specification).

In operation A530, the requester waits for a power mode change confirmation frame (e.g., PACP_PWR_cnf as described in UniPro specification). When the power mode change confirmation frame is received, operation A540 is performed. When a request timer associated with the power mode change request frame expires, operation A600 is performed.

In operation A540, the requester determines whether the power mode change confirmation frame indicates the power mode configuration requested by the power change mode request frame is accepted and performed successfully on the peer (indicated by "Status OK"). If so, operation A550 is performed. If not, operation A570 is performed.

In operation A550, the requester reset a timer to run for end of burst (EoB). In operation A560, the requester ends a TX burst (or referred to as an outbound burst) after receiving the end of burst (EoB).

In operation A570, the requester reports an event according to an indication code of the power mode change confirmation frame. For example, the indication code may indicate a busy state of the peer side, for example, "BUSY" denoted in FIG. 9, representing an indication code of "PWR_BUSY," which indicates the request (e.g., the request transmitted by operation A520) was aborted due to concurrent requests. For example, the indication code may indicate a capability error state of the peer side, for example, "ERR_CAP" denoted in FIG. 9, representing an indication code of "PWR_ERROR_CAP," which indicates the request was rejected because the requested configuration exceeded the Link's capabilities. After the operation A570, operation A580 ends the TX burst (or the outbound burst).

As mentioned above about the operation A530, the operation A600 is performed when the request timer expires. In the operation A600, the requester determines whether retry number reaches a threshold (e.g., 1, 2, or so on). If not, the operation A520 is performed again to retry. If so, operation A610 is performed.

In the operation A610, the requester resumes its DL layer. In operation A620, an error event is reported to an upper protocol layer. In operation A630, a burst ending signal with error indication is transmitted (e.g., the operation A110 in FIG. 4 or FIG. 6; operation S110 in FIG. 5A; operation A310-A330; operation A320-A330).

Figure 10:
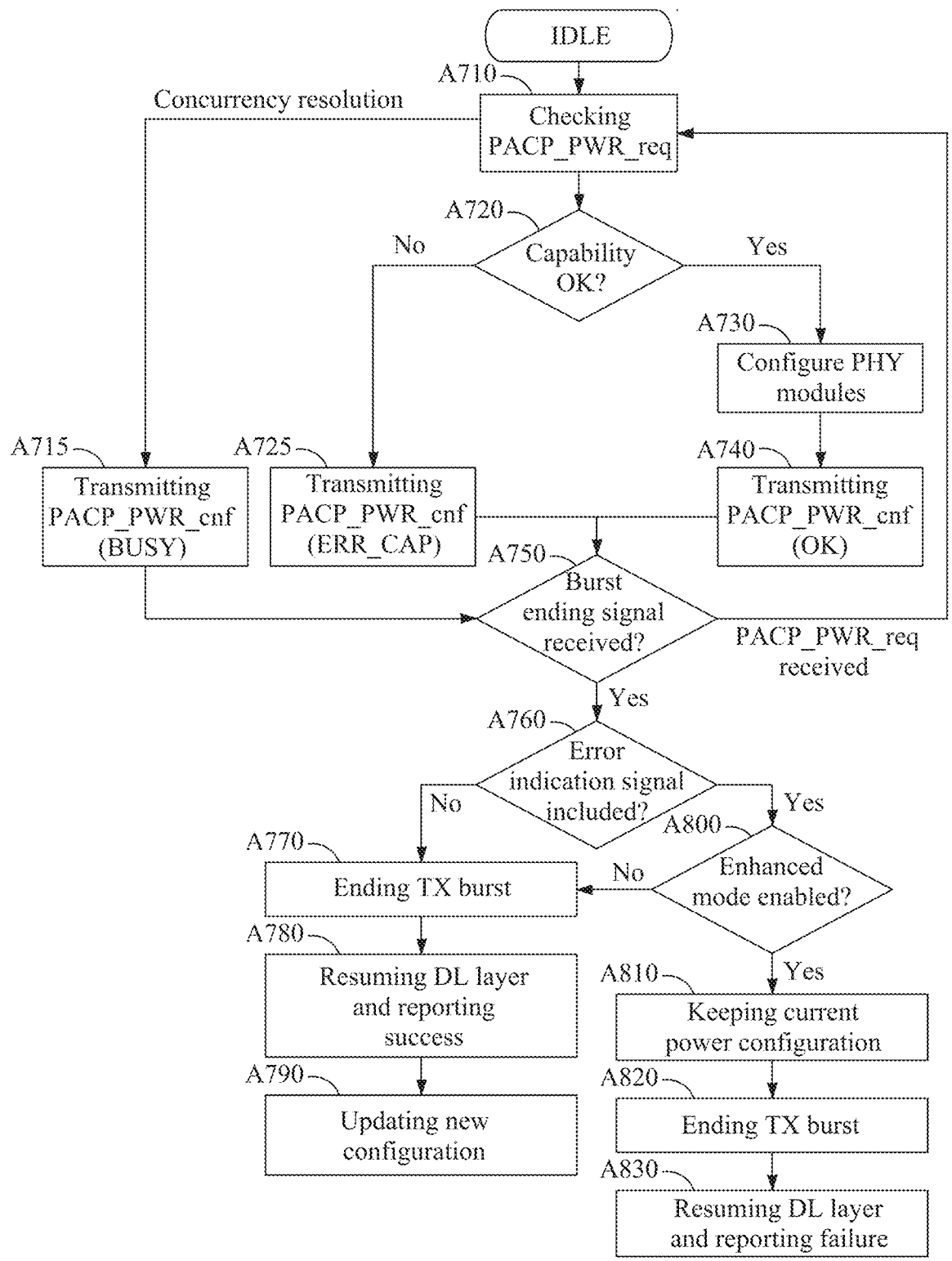
FIG. 10 is a diagram illustrating an embodiment of an operation flow of error recovery of power mode change with respect to a responder.

FIG. 10 illustrates an embodiment of an operation flow of error recovery of power mode change with respect to a responder (e.g., second device 20 or first device 10). FIG. 10 can be implemented as a finite state machine operable in an electronic device (such as the first device 10 or second device 20; or both of them).

Initially, the responder is in an idle state.

In operation A710, the responder checks whether a power mode change request frame is received (e.g., PACP_PWR_req). If it is concurrency resolution, operation A715 is performed to transmit a power mode change confirmation frame (e.g., PACP_PWR_cnf) with an indication code of busy state (BUSY). If the power mode change request frame is received, operation A720 is performed.

In operation A720, the responder determines whether capability requested by the power mode change request frame is accepted (indicated by OK). If so, operation A730 is performed. If not, operation A725 is performed to transmit a power mode change confirmation frame (e.g., PACP_PWR_cnf) with an indication code of capability error state (ERR_CAP).

In the operation A730, the responder configures physical layer (PHY) modules.

In operation A740, the responder transmits a power mode change confirmation frame (e.g., PACP_PWR_cnf) with an indication code of the request being accepted (OK).

In operation A750, the responder determines whether a burst ending signal is received. If so, operation A760 is performed. If a power mode change request frame is received (e.g., PACP_PWR_req), the operation A710 is performed.

In operation A760, the responder determines whether an error indication signal is included in the burst ending signal. If so, operation A800 is performed. If not, operation A770 is performed.

In operation A770, the responder ends the TX burst (or outbound burst). In operation A780, the responder resumes its DL layer and reports success of power mode change. In operation A790, the responder updates new configuration.

In operation A800, the responder determines whether an enhanced mode is enabled. If so, operation A810 is performed. If not, the operation A770 is performed. In the operation A810, the responder keeps a current power mode configuration. In operation A820, the responder ends the TX burst (or outbound burst). In operation A830, the responder resumes its DL layer and reports failure of power mode change.

In addition, the operation flow shown in FIG. 7 or FIG. 8 can be derived from and performed according to the UniPro specification (such as UniPro version 2.0 or so on) with modifications to implement the enhanced frame error recovery of power mode change procedure, for example, on Hibernate Exit procedure. Certainly, the operation flows can also be applied to other procedure, such as link startup procedure, according to UniPro specification or its modified version.

The following provides various embodiments for facilitating error recovery of power mode change of a communication system.

Figure 11A:
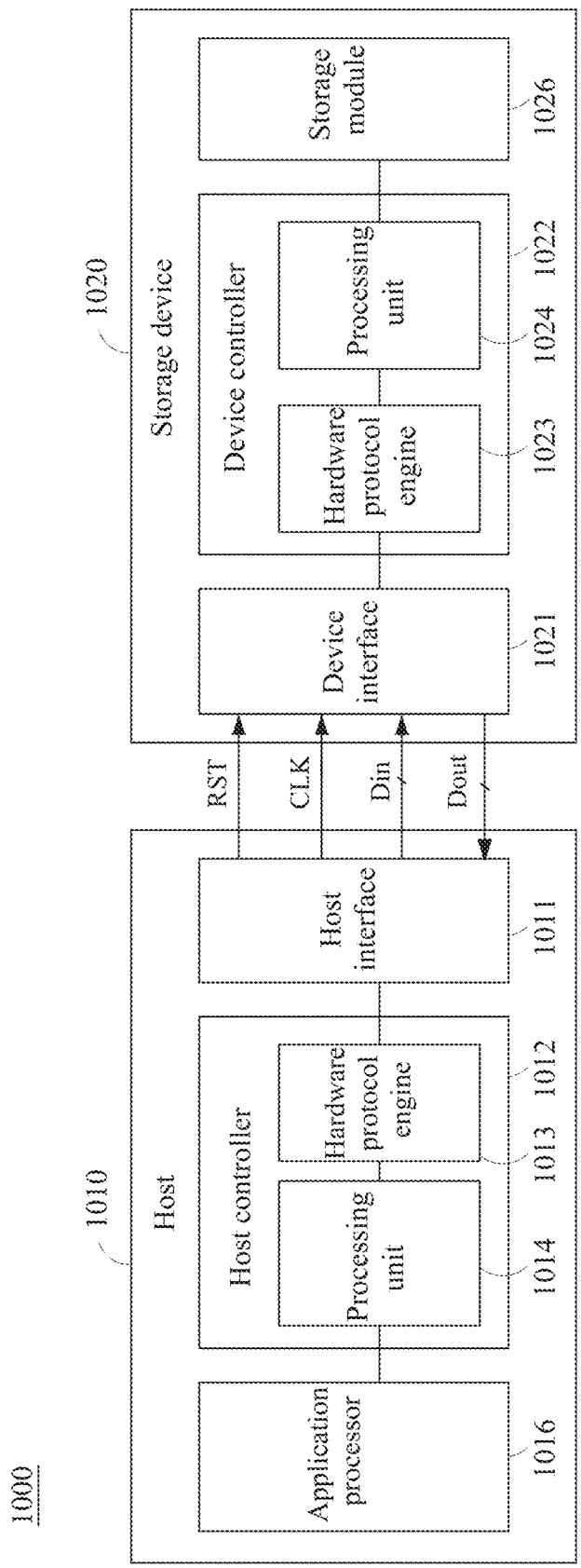
FIG. 11A is a diagram illustrating circuit architecture of a storage system for an interconnection protocol according to an embodiment of the present disclosure.
Figure 11B:
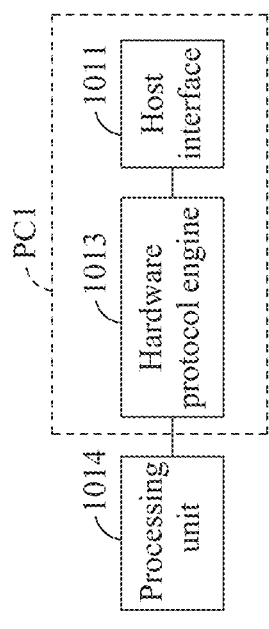
FIG. 11B is a block diagram illustrating circuit architecture applicable to the controller in FIG. 11A for the interconnection protocol according to an embodiment of the present disclosure.
Figure 11C:
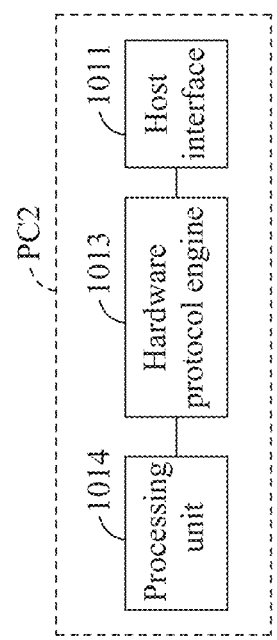
FIG. 11C is a block diagram illustrating circuit architecture applicable to the controller in FIG. 11A for the interconnection protocol according to an embodiment of the present disclosure.

Referring to FIG. 11A, a diagram of circuit architecture is shown according to an embodiment of the present disclosure. As shown in FIG. 11A, a storage system 1000 includes a host 1010 and a storage device 1020. The host 1010 and the storage device 1020 communicate through an interconnection protocol in between, thereby allowing the host 1010 to perform data access of the storage device 1020. The interconnection protocol is capable of performing the method mentioned above based on FIG. 4, FIG. 5A, FIG. 5B, FIG. 6, or any one or more of the embodiments above. According to the circuit architecture in FIG. 11A, the foregoing technique is applicable to a first device 10 of one or more of the embodiments above capable of communicating with a second device 20 of one or more of the embodiments above according to the interconnection protocol, wherein the host 1010 and storage device 1020 can be used to implement the first device 10 and second device 20 respectively, or vice versa. In the circuit architecture of FIG. 11A, a controller in the host 1010 or the storage device 1020 used to implement the interconnection protocol may be implemented by various configurations. As shown in FIG. 11A, the controller (for example, a host controller 1012) in the host 1010 used to implement the interconnection protocol or the controller (for example, a device controller 1022) in the storage device 1020 used to implement the interconnection protocol can be implemented as circuit architecture including a hardware protocol engine and a processing unit, wherein the processing unit of the controller is optional. In another example, as shown in FIG. 11B, the controller in the host 1010 used to implement the interconnection protocol is referred to as, for example, a protocol controller PC1, which can be configured to include a host interface 1011 and a hardware protocol engine 1013 and be implemented as a single chip, wherein a processing unit 1014 may be regarded as an external circuit of the protocol controller PC1. Moreover, similarly, the controller (or referred to as a protocol controller of the storage device 1020) in the storage device 1020 used to implement the interconnection protocol can be configured to include a device interface 1021 and a hardware protocol engine 1023 and be implemented as a single chip, wherein a processing unit 1024 may be regarded as an external circuit of the protocol controller. For another example, as shown in FIG. 11C, the controller in the host 1010 used to implement the interconnection protocol, for example, a protocol controller PC2, can be configured to include the host interface 1011, the hardware protocol engine 1013 and the processing unit 1014, and be implemented as a single chip. Moreover, similarly, the controller (or referred to as a protocol controller of the storage device 1020) in the storage device 1020 used to implement the interconnection protocol can be configured to include the device interface 1021, the hardware protocol engine 1023, and the processing unit 1024, and be implemented as a single chip. Thus, according to the circuit architecture in FIG. 11A, the controller used to implement the interconnection protocol in the host 1010 or the storage device 1020 can be regarded to cover or represent the embodiment based on FIG. 11A, FIG. 11B, or FIG. 11C. The description of other examples related to FIG. 11A is also suitable for the embodiments based on FIG. 11A, FIG. 11B, or FIG. 11C.

The circuit architecture shown in FIG. 11A has sufficient flexibilities and can be efficiently configured to meet requirements of different products, so as to adapt to diversified designs of manufacturers for better product development. The host 1010 is, for example, a computing device such as a smartphone, a tablet computer, a multimedia device, or other electronic devices. The storage device 1020 is, for example, a storage device inside or outside the computing device, and is such as a storage device based on a non-volatile memory. The storage device 1020 is capable of being written with data under control of the host 1010 or providing written data to the host 1010. The storage device 1020 can be implemented as an internal memory device, memory card, solid state drive (SSD), or so on; however, the implementation of the present disclosure is not limited to the examples above.

The host 1010 includes the host interface 1011, the host controller 1012, and an application processor 1016.

The host interface 1011 implements a physical layer of the interconnection protocol so as to link to the storage device 1020. For example, the host interface 1011 implements a modified version of physical (M-PHY) layer as exemplified above.

The host controller 1012 is coupled between the host interface 1011 and the application processor 1016. When the application processor 1016 needs to perform data access of the storage device 1020, it transmits a corresponding access operation command or write data to the host controller 1012 and communicates with the storage device 1020 through the interconnection protocol, thereby completing data access of the storage device 1020.

The host controller 1012 includes, for example, the hardware protocol engine 1013 and the processing unit 1014, wherein the processing unit 1014 is optional.

The hardware protocol engine 1013 implements a link layer of the interconnection protocol. The link layer can be implemented according to a modified version of UniPro as exemplified above. The hardware protocol engine 1013 communicates with the host interface 1011 and the processing unit 1014 and performs data conversion according to the specification of the link layer. In addition, the hardware protocol engine 1013 (or the host controller 1012) can be regarded as an embodiment of the link controller 100 of the first device 10 shown in FIG. 3.

The processing unit 1014 is coupled to the hardware protocol engine 1013, and communicates with the application processor 1016. The processing unit 1014 can execute one or more pieces of firmware. For example, an access operation command or write data output by an operating system, a driver, or an application executed by the application processor 1016 is converted into a command or data in a format compliant with the link layer of the interconnection protocol by the firmware executed by the processing unit 1014, and is then output to the hardware protocol engine 1013 for processing according to specification of the link layer. Alternatively, read data returned by the storage device 1020 in response to a read command of the host 1010 is returned to the hardware protocol engine 1013 according to the specification of the link layer of the interconnection protocol, and is converted by the corresponding firmware executed by the processing unit 1014 into data in a format that is compliant with and readable by the operating system, driver, or application executed by the application processor 1016. The firmware can be stored, for example, in an internal memory of the processing unit 1014, or be stored in an internal memory of the host controller 1012, wherein the internal memory can include a volatile memory and a non-volatile memory. The processing unit 1014 is optional, that is, the task of the firmware above may be implemented in the hardware protocol engine 1013 by using hardware.

The storage device 1020 includes the device interface 1021, the device controller 1022, and a storage module 1026.

The device interface 1021 implements a physical layer of the interconnection protocol to link to the host 1010. For example, the device interface 1021 is for implementing a modified version of physical (M-PHY) layer as exemplified above.

The device controller 1022 is coupled between the device interface 1021 and the storage module 1026. The device controller 1022 has functions corresponding to or similar to those of the host controller 1012 described above, with respect to the interconnection protocol. When the host 1010 issues and transmits an access operation command or write data to the storage device 1020 through the interconnection protocol, the device controller 1022 converts the received data into a corresponding access operation command or write data through the interconnection protocol so as to facilitate data access to be performed by the storage module 1026. Alternatively, the device controller 1022 returns, according to the link layer of the interconnection protocol, read data returned by the storage device 1020 in response to the read command of the host 1010 to the host 1010. The storage module 1026 includes, for example, a memory chip of one or more non-volatile memories, and is, for example, a flash memory chip. In one example, the storage device 1020 may further include a flash memory controller. The flash memory controller is coupled between the device controller 1022 and the storage module 1026, and can be configured to control write, read, or erase operations of the storage module 1026, and is capable of performing data exchange with the storage module 1026 through an address bus or a data bus. In another example, the flash memory controller may be further provided in the device controller 1022.

The device controller 1022 includes, for example, the hardware protocol engine 1023 and the processing unit 1024, wherein the processing unit 1024 is optional.

The hardware protocol engine 1023 implements a link layer of the interconnection protocol. The link layer can be implemented according to a modified version of UniPro as exemplified above. The hardware protocol engine 1023 communicates with the device interface 1021 and the processing unit 1024 and performs data conversion according to the specification of the link layer. In addition, the hardware protocol engine 1023 (or the device controller 1022) can be regarded as an embodiment of the link controller 200 of the second device 20 shown in FIG. 3.

The processing unit 1024 is coupled to the hardware protocol engine 1023, and communicates with the host 1010 through the device interface 1021. The processing unit 1024 can execute one or more pieces of firmware. For example, the processing unit 1024 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 1024, an internal memory of the device controller 1022, or a predetermined storage region of the storage module 1026, wherein the internal memory can include a volatile memory and a non-volatile memory.

As shown in FIG. 11A, the host interface 1011 can be coupled to the device interface 1021, for example, through data lines Din and Dout for transmitting/receiving data, a reset line RST for transmitting a hardware reset signal, and a clock line CLK for transmitting a clock signal. The data lines Din and Dout can be implemented in multiple pairs, wherein one pair of data lines Din or one pair of data lines Dout can be referred to as a lane for transmitting differential signals, for example. The host interface 1011 can communicate with the device interface 1021 by using at least one interface protocol; however, the implementation of the disclosure is not limited to the examples above. Under a modified version of the UFS standard, the host 1010 and the storage device 1020 may also be configured with multiple lanes in between to improve transmission efficiency, wherein either of the directions from the host 1010 to the storage device 1020 or from the storage device 1020 to the host 1010 can support one or more lanes, and the multiple lanes can be selectively set to be active or inactive.

A modified version of the UFS standard is taken as an example of the interconnection protocol. The UFS standard includes a UFS command set (UCS) layer, a UFS transport (UTP) layer, and a UFS interconnect (UIC) layer. The UIC layer includes a link layer and a physical layer. In the interconnection protocol, the link layer of the UIC layer can be implemented according to a modified version of the UniPro specification, and the physical layer of the UIC layer can be implemented according to a modified version of the M-PHY specification.

Figure 12:
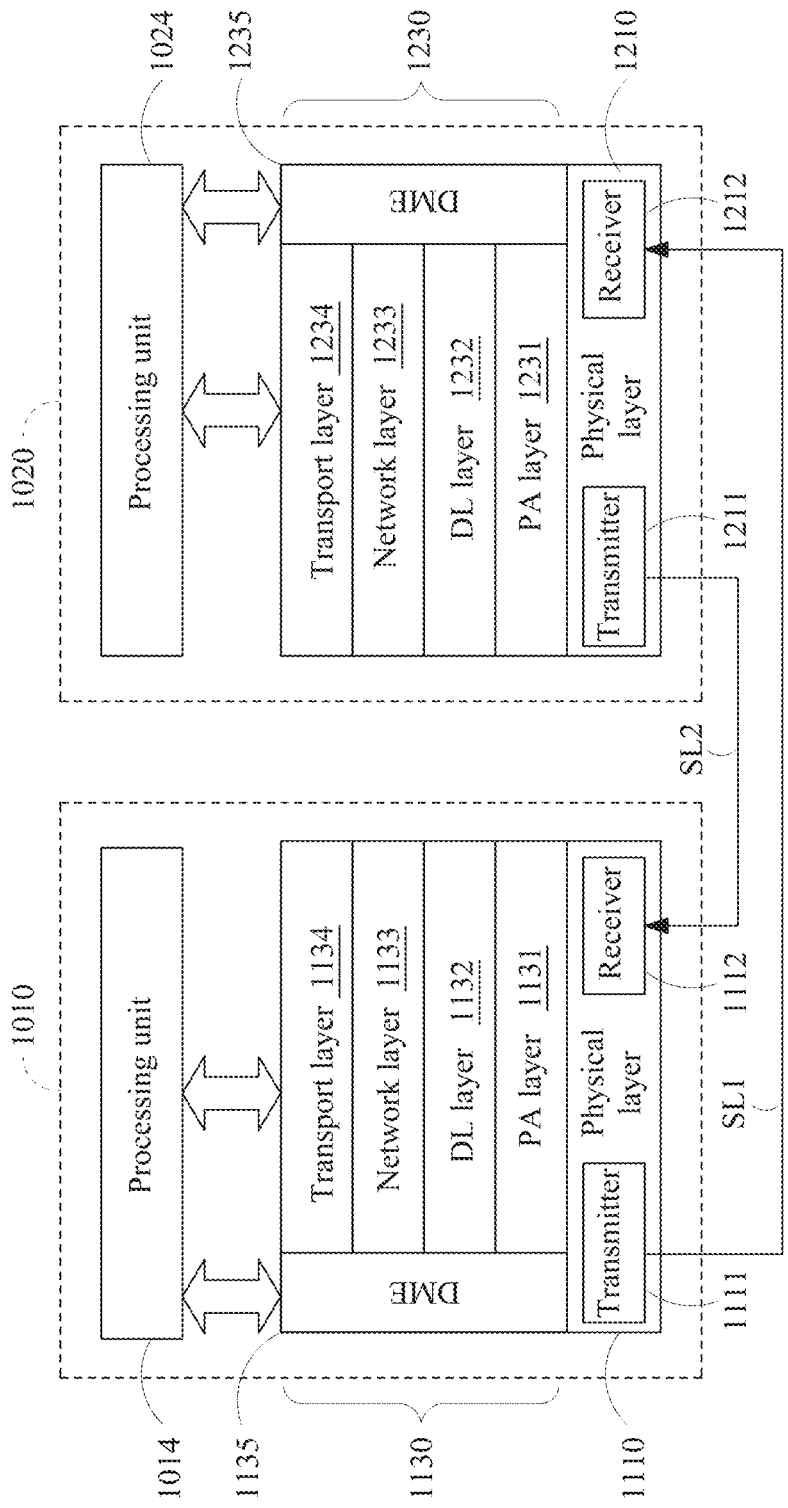
FIG. 12 is a schematic diagram of an embodiment of a layered structure of the storage system in FIG. 11A according to the interconnection protocol.

Referring to FIG. 12, a schematic diagram of an embodiment of layered architecture of the storage system in FIG. 11A is shown according to the UFS standard. Because the UFS standard is based on the MIPI UniPro layer and the MIPI M-PHY layer, the host interface 1011 and the hardware protocol engine 1013 of the host 1010 shown in FIG. 11A are respectively used to implement a modified physical layer 1110 and a modified UniPro layer 1130 in FIG. 12. Also, the device interface 1021 and the hardware protocol engine 1023 of the storage device 1020 in FIG. 11A are respectively used to implement a modified physical layer 1210 and a modified UniPro layer 1230 in FIG. 12.

As shown in FIG. 12, the modified UniPro layer 1130 (or 1230) can include a modified PHY adapter (PA) layer 1131 (or 1231), a data link (DL) layer 1132 (or 1232), a network layer 1133 (or 1233), and a transport layer 134 (or 1234). The layers in the modified UniPro layer 1230 of the storage device 1020 can also similarly operate and be implemented.

The modified PHY adapter layer (1131 or 1231) couples the modified physical layer (1110 or 1210) to the data link layer (1132 or 1232). The modified PHY adapter layer (1131 or 1231) is capable of performing bandwidth control and power management between the modified physical layer (1110 or 1210) and the data link layer (1132 or 1232). In practice, the modified physical layer 1110 of the host 1010 includes a transmitter (TX) 1111 and a receiver (RX) 1112, and the modified physical layer 1210 of the storage device 1020 includes a transmitter (TX) 1211 and a receiver (RX) 1212, thereby establishing data lanes SL1 and SL2 to perform full duplex communication. The modified UniPro specification may support multiple data lanes for a link in each transmission direction (for example, forward or backward).

The data link layer (1132 or 1232) is capable of performing flow control of data transmission between the host 1010 and the storage device 1020. The data link layer is capable of performing error detection and re-transmission of a frame in case of errors, according to one or more of the embodiments above.

The network layer (1133 or 1233) is used to select a routing function for a transmission path for the packets received from the transport layer (1134 or 1234).

The transport layer (1134 or 1234) can use a command received from the UFS application layer to configure a data segment suitable for the protocol and transmit the data segment to the network layer (1133 or 1233), or can extract a command from packets received from the network layer (1133 or 1233) and transmit the command to the UFS application layer.

Moreover, the modified UniPro layer (1130 or 1230) can be further implemented with a device management entity (DME) (1135 or 1235), which can communicate with the layers in the modified physical layer (1110 or 1210) and the modified UniPro layer (1130 or 1230), for example, the modified PHY adapter layer (1131 or 1231), the data link layer (132 or 232), the network layer (1133 or 1233), and the transport layer (1134 or 1234), so as to communicate with the UFS application layer, thereby implementing the modified unified protocol (UniPro) overall functions such as control or configuration functions including power-on, power-off, reset, and power mode change.

The circuit architecture in FIG. 11A, FIG. 11B, FIG. 11C, or FIG. 12 can be applied to a controller in FIG. 3 to perform operations according to one or more of the embodiments of FIG. 4, FIG. 5A, FIG. 5B, FIG. 6, FIG. 7, FIG. 8A, FIG. 8B, FIG. 9, or FIG. 10, or one or more related embodiments or examples, whenever appropriate.

In some embodiments, the interconnection protocol is based on UniPro and M-PHY, and a high-speed burst state (e.g., denoted by HS-BURST as described in the M-PHY specification) can be used to implement one or more of the embodiments of FIG. 4, FIG. 5A, FIG. 5B, FIG. 6, FIG. 7, FIG. 8A, FIG. 8B, FIG. 9, or FIG. 10, or one or more related embodiments or examples. After a transmitter module of the physical layer circuit of a first device and a receiver module of the physical layer circuit of a second device have entered the HS-BURST state, the effective data transmission from or to an associated upper layer (e.g., "link layer" such as a UniPro layer) can be performed.

Figure 13:
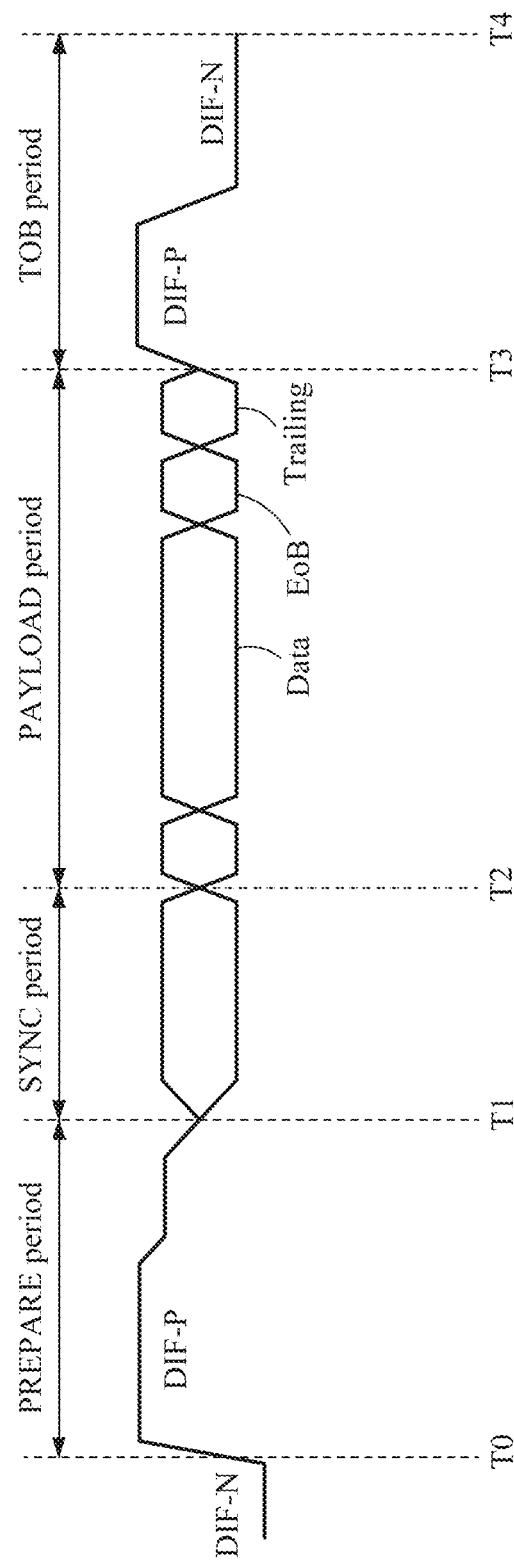
FIG. 13 is a timing diagram illustrating an embodiment of operations of a burst state of a transmitter module of an electronic device.

As mentioned in the embodiment related to FIG. 3, when a burst is opened between a first device and a second device, an associated transmitter module of the first device and an associated receiver module of the second device enter a burst state. For example, the burst state includes several sub-states such as a prepare (PREPARE) state, a synchronization (SYNC) state, a payload (PAYLOAD) state, and a tail-of-burst (TOB) state. FIG. 13 is a timing diagram illustrating an embodiment of operations of a burst state of a transmitter module of an electronic device (e.g., first device 10 or second device 20). In this embodiment, the transmitter module is configured to provide line termination during the burst state, which can be illustrated in FIG. 13 by the signal level changes during the PREPARE state and (exit-to-) a power saving state. Likewise, operations of a burst state of a receiver module of an electronic device can be obtained based on that of FIG. 13 and will not be repeated for the sake of brevity. The following provides examples of the sub-states of the burst state.

In the PREPARE state, the transmitter module of the physical layer of the electronic device (e.g., first device 10 (or second device 20)) asserts a signal on a line for a lane so that a receiver module of the remote electronic device (e.g., second device 20 (or first device 10)) recognizes the PREPARE state and acts accordingly. For example, the transmitter module drives a line (e.g., a pair of data lines Din (or a pair of data lines Dout)) for a lane with a specific data pattern or signal level pattern (e.g., a positive differential voltage such as DIF-P as described in the M-PHY specification) for a specified time interval (e.g., a PREPARE period between time points T0 and T1 as illustrated in FIG. 13). When the receiver module of the remote electronic device on the lane detects the specific signal level pattern (e.g., DIF-P), the receiver module will wake up or enable associated logic circuit or modules (such as phase lock loop (PLL), termination, and so on).

In the SYNC state, the transmitter module transmits a specific data pattern or signal level pattern for a specified time interval (e.g., a SYNC period between time points T1 and T2 as illustrated in FIG. 13). The remote receiver module can take advantage of this kind of patterns to lock its timing logic module (e.g., PLL and so on).

In the PAYLOAD state, the transmitter module transmits data, which can be symbols belonging to a unit of data transmission such as a PACP frame, a DL frame, or so on, during a PAYLOAD period as illustrated in FIG. 13. The remote receiver module can pass received symbols to an upper layer such as PA layer, DL layer, or so on. When it is going to close the burst, the transmitter module can transmit an end of burst (denoted by "EoB") signal and a trailing signal (denoted by "Trailing"), as illustrated in FIG. 13. The end of burst signal and trailing signal illustrated in FIG. 13 can be regarded as examples of the operations A310-A320 (or A410-A420) in FIG. 7, FIG. 8A, or FIG. 8B or related embodiments. In addition, the end of burst signal or trailing signal is optional.

In the TOB state, the transmitter module drives the line (e.g., a pair of data lines Din (or a pair of data lines Dout)) on the lane with a specific data pattern or signal level pattern (e.g., examples related to TABLE 1 or other patterns) for a specified time interval (e.g., a TOB period between time points T3 and T4 as illustrated in FIG. 13) to indicate the ending of the current burst state. In FIG. 13, a tail of burst signal based on an example of the above TABLE 1 is illustrated to indicate a power mode change failure additionally and can be regarded as an example of the operation A330 (or A430) in FIG. 7, FIG. 8A, or FIG. 8B or related embodiments. In this case, the remote electronic device can be configured to detect the TOB so as to be notified of the power mode change failure in the local electronic device. The receiver module can exit the burst state and return to a power saving state (e.g., a SAVE state as described in the M-PHY specification). The remote electronic device can be configured to perform operations based on one or more of the embodiments of FIG. 4, FIG. 5B, FIG. 6, FIG. 7, FIG. 8A, FIG. 8B, or FIG. 10, or one or more related embodiments or examples.

In the present disclosure, "asserting" a signal (or other alternative forms such as "asserted" or "assertion") means that a signal is set to be in an active state (or an active voltage level), which may be a high or low level. "De-asserting" a signal (or other alternative forms such as "de-asserted" or "de-assertion") means that a signal is set to be in an inactive state (or an inactive voltage level), which may be a high or low level. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

As illustrated by the above embodiments of the present disclosure, the technologies for facilitating error recovery of power mode change of a communication system are provided. The technologies are suitable to implement in various embodiment as methods for an electronic device in a power mode change operation, electronic devices, and communication systems. An electronic device which encounters a power mode change failure is capable of notifying another electronic device of the power mode change failure by using a burst ending signal. Thus, in response to the burst ending signal, the other electronic device can abort a power mode configuration obtained during the power mode change operation to avoid undesirable un-synchronous states. Accordingly, both sides of the communication system are capable of performing operations for error recovery to avoid collision and being more efficient for error recovery.

The present disclosure is described by using the multiple embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method for an electronic device in a power mode change operation, the method comprising:
 by the electronic device, during the power mode change operation, detecting whether a power mode change failure occurs in the electronic device after transmitting a power mode change request frame; and by the electronic device, in response to the power mode change failure in the electronic device, transmitting a first burst ending signal in a first burst to another electronic device to notify the other electronic device of the power mode change failure in the electronic device, wherein the first burst ending signal indicates burst closure and includes a first error indication signal to indicate the power mode change failure in the electronic device.

2. The method according to claim 1, wherein the first burst ending signal is transmitted in the first burst to the other electronic device to notify the other electronic device of the power mode change failure in the electronic device so that the other electronic device is capable of accepting the power mode change failure in the electronic device to abort a power mode configuration obtained during the power mode change operation and to end the first burst.

3. The method according to claim 1, wherein the first error indication signal of the first burst ending signal includes a data pattern to indicate the power mode change failure in the electronic device.

4. The method according to claim 1, wherein the first error indication signal of the first burst ending signal includes a tail of burst to indicate the power mode change failure in the electronic device and to indicate closure of the first burst.

5. The method according to claim 1, wherein the first error indication signal of the first burst ending signal includes a data pattern and a tail of burst, to indicate the power mode change failure in the electronic device and to indicate closure of the first burst.

6. An electronic device configured to communicate with another electronic device, the electronic device comprising:
    a controller including:
        a physical layer circuit for signal transmission; and
        a link controller for data transmission, coupled to the physical layer circuit, wherein the controller is capable of performing a plurality of operations including:
    during a power mode change operation, detecting whether a power mode change failure occurs in the electronic device after transmitting a power mode change request frame; and
    in response to the power mode change failure in the electronic device, transmitting the first burst ending signal in a first burst to the other electronic device to notify the other electronic device of the power mode change failure in the electronic device, wherein the first burst ending signal indicates burst closure and includes a first error indication signal to indicate the power mode change failure in the electronic device.

7. The electronic device according to claim 6, wherein the first burst ending signal is transmitted in the first burst to the other electronic device to notify the other electronic device of the power mode change failure in the electronic device so that the other electronic device is capable of accepting the power mode change failure in the electronic device to abort a power mode configuration obtained during the power mode change operation and to end the first burst.

8. The electronic device according to claim 6, wherein the first error indication signal of the first burst ending signal includes a data pattern to indicate the power mode change failure in the electronic device.

9. The electronic device according to claim 6, wherein the first error indication signal of the first burst ending signal includes a tail of burst to indicate the power mode change failure in the electronic device and to indicate closure of the first burst.

10. The electronic device according to claim 6, wherein the first error indication signal of the first burst ending signal includes a data pattern and a tail of burst, to indicate the power mode change failure in the electronic device and to indicate closure of the first burst.

11. A method for an electronic device in a power mode change operation, the method comprising:
    by the electronic device, during the power mode change operation, receiving a first burst ending signal in a first burst from another electronic device and detecting that the first burst ending signal indicates burst closure and includes a first error indication signal to notify the electronic device that a power mode change failure occurs in the other electronic device; and
    by the electronic device, in response to the detected first burst ending signal, accepting the power mode change failure in the other electronic device to abort a power mode configuration obtained during the power mode change operation and to end the first burst.

12. The method according to claim 11, wherein the method further comprises:
    by the electronic device, in response to the detected first burst ending signal, reporting a power mode change failure in the other electronic device to a protocol layer of the electronic device after the first burst from the other electronic device to the electronic device is closed.

13. The method according to claim 11, wherein the method further comprises:
    by the electronic device, in response to the first burst ending signal, enabling a physical layer circuit of the electronic device to keep a current power mode configuration.

14. The method according to claim 11, wherein the first error indication signal of the first burst ending signal includes a data pattern to notify the electronic device that the power mode change failure occurs in the other electronic device.

15. The method according to claim 11, wherein the first error indication signal of the first burst ending signal includes a tail of burst to notify the electronic device of the power mode change failure in the other electronic device and to indicate closure of the first burst.

16. The method according to claim 11, wherein the first error indication signal of the first burst ending signal includes a data pattern and a tail of burst, to notify the electronic device of the power mode change failure in the other electronic device and to indicate closure of the first burst.

17. The method according to claim 13, wherein the method further comprises:
    by the electronic device, after the physical layer circuit of the electronic device is enabled to keep the current power mode configuration and the first burst is closed, transmitting a second burst ending signal which indicates burst closure and includes a second error indication signal to notify the other electronic device that a power mode change failure occurs in the electronic device.

18. An electronic device configured to communicate with another electronic device, the electronic device comprising:
    a controller including:
        a physical layer circuit for signal transmission; and
        a link controller for data transmission, coupled to the physical layer circuit, wherein the controller is capable of performing a plurality of operations including:
- during the power mode change operation, receiving a first burst ending signal in a first burst from the other electronic device and detecting that the first burst ending signal indicates burst closure and includes a first error indication signal to notify the electronic device that a power mode change failure occurs in the other electronic device; and
- in response to the detected first burst ending signal, accepting the power mode change failure in the other electronic device to abort the power mode configuration obtained during the power mode change operation and to end the first burst.

19. The electronic device according to claim 18, wherein the plurality of operations further comprises:
- in response to the first burst ending signal, reporting a power mode change failure in the electronic device to a protocol layer of the electronic device after the first burst from the other electronic device to the electronic device is closed.

20. The electronic device according to claim 18, wherein the plurality of operations further comprises:
- in response to the first burst ending signal, enabling a physical layer circuit of the electronic device to keep a current power mode configuration.

21. The electronic device according to claim 18, wherein the first error indication signal of the first burst ending signal includes a data pattern to notify the electronic device that the power mode change failure occurs in the other electronic device.

22. The electronic device according to claim 18, wherein the first error indication signal of the first burst ending signal includes a tail of burst to notify the electronic device of the power mode change failure in the other electronic device and to indicate closure of the first burst.

23. The electronic device according to claim 18, wherein the first error indication signal of the first burst ending signal includes a data pattern and a tail of burst to notify the electronic device of the power mode change failure in the other electronic device and to indicate closure of the first burst.

24. The electronic device according to claim 20, wherein the plurality of operations further comprises:
- after the physical layer circuit of the electronic device is enabled to keep the current power mode configuration and the first burst is closed, transmitting a second burst ending signal which indicates burst closure and includes a second error indication signal to notify the other electronic device that a power mode change failure occurs in the electronic device.

25. A communication system comprising:
- a first electronic device configured to transmit a first burst ending signal in a first burst during a power mode change operation when a power mode change failure occurs in the first electronic device, wherein the first burst ending signal indicates burst closure and includes a first error indication signal to indicate the power mode change failure in the first electronic device; and
- a second electronic device configured, during the power mode change operation, to receive the first burst ending signal in the first burst from the first electronic device and to detect that the first burst ending signal indicates burst closure and includes the first error indication signal to indicate the power mode change failure in the first electronic device,
- wherein in response to the detected first burst ending signal, the second electronic device accepts the power mode change failure in the first electronic device to abort a power mode configuration obtained during the power mode change operation and to end the first burst.

26. The communication system according to claim 25, wherein the first error indication signal of the first burst ending signal includes a data pattern to indicate the power mode change failure in the first electronic device.

27. The communication system according to claim 25, wherein the first error indication signal of the first burst ending signal includes a tail of burst to indicate the power mode change failure in the first electronic device and to indicate closure of the first burst.

28. The communication system according to claim 25, wherein the first error indication signal of the first burst ending signal includes a data pattern and a tail of burst, to indicate the power mode change failure in the first electronic device and to indicate closure of the first burst.

* * * * *